(12) United States Patent
Cochenour

(10) Patent No.: US 9,386,034 B2
(45) Date of Patent: Jul. 5, 2016

(54) BEHAVIORAL MODEL BASED MALWARE PROTECTION SYSTEM AND METHOD

(71) Applicant: Hoplite Industries, Inc., Bozeman, MT (US)

(72) Inventor: Anthony James Cochenour, Bozeman, MT (US)

(73) Assignee: HOPLITE INDUSTRIES, INC., Bozeman, MT (US)

( * ) Notice: Subject to any disclaimer, the term of this patent is extended or adjusted under 35 U.S.C. 154(b) by 185 days.

(21) Appl. No.: 14/151,252

(22) Filed: Jan. 9, 2014

(65) Prior Publication Data
US 2015/0172300 A1     Jun. 18, 2015

Related U.S. Application Data

(60) Provisional application No. 61/917,049, filed on Dec. 17, 2013.

(51) Int. Cl.
*H04L 29/06* (2006.01)
(52) U.S. Cl.
CPC .......... *H04L 63/145* (2013.01); *H04L 63/1425* (2013.01)

(58) Field of Classification Search
CPC ..................... H04L 63/1425; H04L 63/145
USPC ........................................................ 726/23
See application file for complete search history.

(56) References Cited

U.S. PATENT DOCUMENTS

| | | | |
|---|---|---|---|
| 7,694,150 B1* | 4/2010 | Kirby | G06F 21/55 713/188 |
| 2014/0165207 A1* | 6/2014 | Engel | H04L 63/1425 726/25 |
| 2014/0181975 A1* | 6/2014 | Spernow | G06F 21/562 726/23 |

* cited by examiner

*Primary Examiner* — Dao Ho
(74) *Attorney, Agent, or Firm* — Hauptman Ham, LLP

(57) ABSTRACT

A method of protecting a computing system or device against a malicious threat such as malware comprises generating a behavioral model configured to describe one or more interactions associated with a protected data accessible by way of a computing device. The method also comprises determining an attempt to access the protected is abnormal based, at least in part, on a comparison between the attempt to access the protected data and the behavioral model. The method further comprises determining the abnormal attempt to access the protected data is a malicious process based, at least in part, on a determined degree of variation from the behavioral model. The method additionally comprises causing, by a processor, the malicious process to be remediated with respect to the computing device.

21 Claims, 10 Drawing Sheets

BEHAVIORAL MODEL BASED MALWARE PROTECTION SYSTEM AND METHOD

PRIORITY CLAIM

The present application claims priority of U.S. Provisional Application No. 61/917,049, filed Dec. 17, 2013, which is incorporated herein by reference in its entirety.

BACKGROUND

Information Technology (IT) professionals, service providers and device manufacturers (e.g., computing device, mobile device, network providers, wireless, cellular, etc.) are continually challenged to deliver secure services and data protection to users by, for example, protecting against malicious software that is intended to compromise computing systems and devices.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

DETAILED DESCRIPTION

The following disclosure provides many different embodiments, or examples, of a method, apparatus, and computer program for providing behavioral model based identification, analysis and/or remediation of computing system security threats. In the following description, for the purposes of explanation, numerous specific details are set forth in order to provide a thorough understanding of the embodiments. Specific examples of components and arrangements are described below to simplify the present disclosure. It is apparent, however, to one skilled in the art that the embodiments may be practiced without these specific details, with an equivalent arrangement, or in any order. These are examples and are not intended to be limiting. In some instances, well-known structures and devices are shown in block diagram form in order to avoid unnecessarily obscuring the embodiments.

As used herein, the term malware refers to any malicious software or malicious process that is intended, for example, to compromise one or more computing systems, and/or provide an avenue to control resources and/or read or write data within the one or more computing systems. Examples of malware include, but should not be considered limited to, viruses, worms, bots, and software otherwise generically known as malware, among others.

Figure 1:
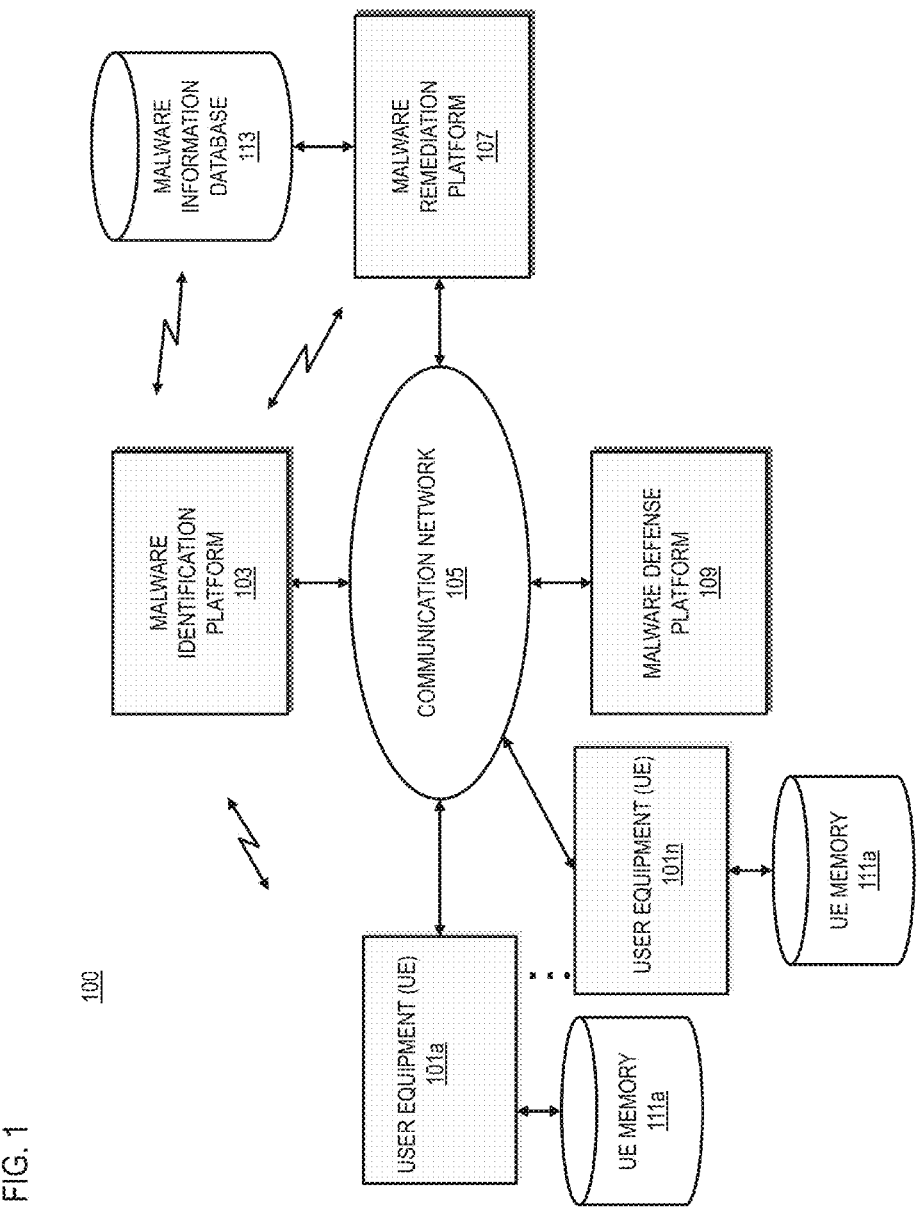
FIG. 1 is a diagram of a system capable of providing behavioral model based identification, analysis and/or remediation of computing system security threats, in accordance with one or more embodiments.

FIG. 1 is a diagram of a system 100 capable of providing behavioral model based computing system security, in accordance with one or more embodiments.

Malware poses a significant threat to computing system security. Malware easily circumvents traditional signature-based security technologies. The level of sophistication of both exploitation and evasion capabilities of common malware has evolved into a series of Advanced Persistent Threats (APT). While these threats vary in many ways, they all share common traits.

For example, initial malicious attacks on computing systems often take many forms, or vectors. But, regardless of form or vector, initial attacks are all intended to gain access to seek out specifically targeted computing systems, individuals and/or data. Initial compromises are commonly 'land and expand' opportunities to move laterally through other systems, and perform reconnaissance prior to executing privilege escalation. After an initial compromise, APT malware commonly use advanced polymorphism, packing, and hibernation techniques to resist detection and removal. APT compromises often aim to establish uncontested visibility, control, and access to intellectual property, financial assets, and any network assets that might contain valuable data, or are leverage points for physical assets.

Common computing system security research and development efforts have largely been unable to keep pace with accurately identifying and defending against APT. Identifying and defending against APT is difficult because of the untold number of application, operating system (OS), and network vulnerabilities that exist within an estimated 10 billion Internet-connected computing devices. The rapid proliferation of powerful mobile devices coupled with the nearly pervasive availability of Software as a Service (SaaS) applications, and various other cloud computing models that rely heavily upon first and third party data exchange, has provided a target rich environment that is more difficult to defend from a malicious process or attack than traditional Enterprise applications and platforms. Emerging trends, including the recent 'Internet of Everything' movement, that may involve connecting billions more devices to the Internet, such as soil and water quality sensors, will further expand attack surfaces that are likely to be exploited for control, profit and reconnaissance purposes.

These clear and present threats to national security, global financial systems, and Personal Health Information (PHI) are increasingly the weapons of choice in the hands of hackers, organized crime syndicates, aggressive nation states, and distributed group actors. With comparatively little resources required, attackers could, in extreme circumstances, effectively disrupt, for example, critical financial markets, utilities, mass transit, healthcare, military and/or intelligence assets for extended periods of time.

Current malware threats tend to be stratified by different levels of sophistication, and the resistance of the malware to identification and removal, which are usually based on the level of financial and technical investment in creating the malware threat. The evolution of threats to the general populous tend to originate from individual contributors and organized crime syndicates, both of which have clear financial motivation, while the gravest threats to national or global security tend to originate from nation state actors.

Example malware threats include Proof of Concept, or zero-day malware, that exploit previously undiscovered, or undisclosed OS, application or network vulnerabilities. A growing market has been established for the development and sale of zero-day exploits. Although OS and Independent Software Vendors (ISV) sometimes provide patches and various other protective measures in a reactive fashion, it is unlikely that the remediation will occur on all affected systems. As such, aged malware often remains active for many years. For example, the Code Red worm that originated in July 2001 is still active on the Internet today.

Example malware threats also include Malware as a Service, or pay-to-use malware frameworks, developed and maintained by organized crime syndicates that openly sell compilation-ready malware code on the open market. This form of mass-market malware distribution allows small nation states or distributed group actors to execute effective asymmetric attacks which leave little or no evidence. Such attacks make attribution difficult or impossible. This category of modern malware is considered to be a growth industry as many dissident and terrorist organizations re-orient operations to attack electronic targets.

Example malware threats further include APT or fully weaponized malware. APT or fully weaponized malware is generally attributed to nation states due to the resources required for research and development. Such malware is among the most effective and targeted of modern malware, and is often used as a means to further geo-political, military or intelligence agendas. Many significant global threats exist within this category. APT malware is typically more advanced and resilient than that which is made commercially available. Some APT operations last an average of 416 days before the compromise has been discovered. Most APT malware is limited to secretive operations so as to conceal the APT's capabilities for a maximum period of time, amplifying the danger the APT poses to a compromised computing system.

Some notorious example APT malware attacks include Operation Aurora (2009), Night Dragon (2011), Stuxnet (discovered approximately 2010), and Red October (approximately 2007 to 2013). To date, the advanced polymorphism and detection evasion techniques of Red October, its over two hundred (200) reconnaissance modules, and its extreme adaptability to OS and hardware platforms makes Red October among the most advanced APT malware ever created. In each example APT malware attack, the attackers sought and attained a combination of control and access to information as a means to achieve a series of damaging and deadly goals.

The nature of various malware threats is influenced directly by the intent of the author/attacker of the malware. Common malware targets or interests include, but are not limited to, control of or access to financial data or systems, data or systems of interest for industrial espionage, critical infrastructure command and control, geo-political and military espionage, or defense infrastructure command and control, various other targeted purposes, or simply for author/attacker amusement with no specific target or purpose at all.

Conventional anti-malware software applications sometimes leverage malware signatures which take the form of a file-level cryptographic checksum such as the MD5 hashing algorithm, byte hashes, small segments of a scanned file, or fuzzy hashing. Based on the malware signature, conventional anti-malware systems often perform a percentage match of suspect files against known-malicious files to identify a malware threat. Upon discovery of the presence of malware, new malware signatures are developed manually through reverse engineering methods, and then distributed to deployed anti-malware software to enhance protection of client devices. Upon finding a sufficient match, anti-malware software often attempts to isolate and remove malicious software. When implemented well, signature-based anti-malware can be a component of an effective defense against known malware. However, signature-based anti-malware fails to effectively protect against emergent threats. Security methodologies using any combination of malware signatures are reactive by nature, meaning that protection is provided only after compromises have occurred.

To circumvent signature-based anti-malware software protection, malware authors have stayed well ahead of the security industry by implementing various evasion techniques that cloak malware from signature-based scanning. Techniques such as Polymorphism, Metamorphism and Oligomorphism, for example, implement semi-autonomous code-generating engines that are able to quickly evade static signature-based scanning by making each subsequent file or host compromise appear to be different from the last. When coupled with packing or encryption techniques, it is possible for a single strain of malware to have hundreds or thousands of unique signatures making reactive signature-based anti-malware largely ineffective.

Some conventional anti-malware software applications employ heuristics in an attempt to protect a computing device from a malicious process. Developed as a second generation of protection against malware, heuristics combine a series of related static signatures and specific activities, or rules, to more broadly identify malware. A heuristic approach allows for more flexibility in the face of Polymorphic malware threats by increasing the overall number of file attributes and actions that are compared. Heuristic approaches, however, are often associated with increased false positive rates compared to signature-based anti-malware approaches by at least an order of magnitude. Although coupling well-developed heuristics with static signatures increases efficacy of traditional anti-malware applications, it merely represents a scalar increase in complexity for malware authors who need only modify the order of operations within the malware to evade heuristic detection. In the face of zero-day malware threats, heuristic scanning provides little or no protection unless malware authors carelessly re-use exploit code. Maximum heuristic protection rates have been recently measured at only 5% against zero-day threats. Additionally, significant emphasis on heuristic scanning can cause traditional anti-malware software to be computationally wasteful in terms of system resource consumption (e.g., CPU and RAM consumption) with little or no benefit.

Another common anti-malware approach involves cumulative reputation scoring approaches that seeks to rate the trustworthiness of a given external entity (e.g., internet protocol address, domain name, email address) based on past behavior. Legacy reputation frameworks gather raw telemetry (e.g., server logs and manually submitted reports) from participating members in an effort to develop accurate information on external entities (e.g., from the point of view of participating members). The cumulative reputation scoring information is periodically summarized and shared with participating members who are able to make more informed decisions about the security posture of all scored and known external entities. Within this model, previously unseen external entities are often trusted by default so as to not impact benign operations such as mail delivery.

Although well-developed reputation scoring frameworks have been shown to increase the efficacy of traditional anti-malware, and tend to have low false positive rates compared to heuristic approaches, the enhanced protection provided by reputation scoring frameworks falters in the face of zero-day and targeted APT threats. These failings are most evident when trusted external entities are compromised first, and then used as platforms for subsequent attacks. For example, a malicious attack could be executed under the guise of complete system-level trust, if, for example, the attackers appeared to be trusted external Virtual Private Network (VPN) entities that were ignored by reputation scoring frameworks.

In a partial shift of defensive capabilities to the network, away from the clients, some anti-malware applications use Contextual Application Security (CAS) frameworks to perform in-band (i.e., within the network traffic path) inspection so as to establish both context and trustworthiness of network payloads. This trust context is established by coupling the above-discussed malware signatures, heuristics, and reputation scoring with application protocol behavior and file format rules.

While seemingly being capable of combining the benefits of the above-discussed anti-malware techniques, Contextual Application Security is required to be in the network traffic path and, as a result, potentially becomes blocking architecture (i.e., network redundancy and/or performance limiting) and a potential target for attackers. In the former case, attackers may choose to overwhelm Contextual Application Security devices with excess traffic in an attempt to create a 'fail-open' scenario to force the network to divert traffic away from security devices that would thus become unresponsive under extreme loads. In the latter case, attackers sometimes opt for a more elegant out-of-band attack on supporting infrastructure such as Domain Name Service (DNS), Authentication, Authorization & Accounting (AAA) services, or Network Time Protocol (NTP) in an effort to logically disable the security devices.

Contextual Application Security models have been developed and applied as a stateless, or one time, method of evaluating the safety and trustworthiness of an executable or network flow. Contextual Application Security, however, is subject to evasion by hibernating malware, or by employing encrypted or highly polymorphic malware that needs only mimic benign software through initial scanning. Beyond the scanning event, many strains of malware are able to execute uncontested under traditional anti-malware defenses.

Operating Systems and virtualization hypervisors are, and will likely remain, a large source of vulnerabilities that are often exploited by APT and other malware. Although desktop workstations, laptops, and servers remain lucrative targets, malware authors have signaled a clear shift of focus toward the one billion plus mobile devices in use today. When considered in combination with the staggering number of application vulnerabilities, the sheer size, complexity, and growing attack surfaces for modern OS platforms, it becomes clear that providing sufficient layers of defense with traditional techniques has been ineffective. Furthermore, the sometimes frequent delayed release of critical security patches, Enterprise IT patch validation cycles, and limited maintenance windows create further challenges that virtually guarantee increased exposure to vulnerabilities. The wholly reactive nature of traditional anti-malware is ill suited to provide protection against the growing number of vulnerabilities that are exploitable by zero-day threats. Undertaking the task of identifying and protecting all such vulnerabilities in a given OS or hypervisor is a costly scenario that would only provide a window of protection for a given platform.

Users and user interactions with computing devices are among the weakest points in any given chain of trust and security. APT and other malware authors have long since adopted proven techniques to fool, even sometimes savvy, users into unknowingly compromising the security of their system(s) and by extension, networks. This trickery, generally known as Phishing (or Spear Phishing when used against individuals with significant systems privileges), may take many different attack vectors. Tantamount among them are email and social engineering, or the process of an attacker engaging in direct contact under the guise of some legitimate need or transaction. Through these interactions, the attacker has ample opportunity to bypass established signature or policy-based security, and fool the victim into executing the initial compromise code that provides the attacker entry into a computing system to begin reconnaissance and covert operations.

Further, security issues associated with social media and blurred lines of privacy, provide attackers with the ability to locate, target, and exploit higher profile individuals that have significant systems privileges, and deliver malicious software payloads. Very few programmatic defenses against misuse of elevated systems privileges exist, making Spear Phishing among the most effective and devastating forms of APT compromise. Traditional static anti-malware techniques are largely ineffective in this arena and provide no additional protection when system privileges are unknowingly misused.

Despite the many layers of available anti-malware approaches, software and frameworks, a single and disarmingly simple mechanism can often defeat even the most sophisticated defenses, namely asymmetric encryption. To provide any level of protection, conventional anti-malware software packages and frameworks require clear text (i.e., non-encrypted) access to data, be it at rest on disk or in motion over a network. Although many network-based solutions, such as Contextual Application Security devices, have the capability to intercept and inspect content protected by Public Key Encryption (e.g., SSL and TLS), by way of legitimate man-in-the-middle (MITM) techniques, no such options exist for combating content or network flows protected by asymmetric encryption at the hands of malware authors and botnet operators.

An example global malware botnet that employed asymmetric encryption was built using the Zeus malware platform (cybertheft botnet). This successful and resilient botnet not only utilized asymmetric encryption to protect its covert C&C channels, but also included a feature that provides each bot (numbering in the tens of millions) a unique encryption key, adding multiplicity to an already challenging problem. Using this approach, the Zeus malware authors created an encrypted network with unparalleled segmentation and resistance to compromise against law enforcement and malware researchers. After several years and coordination of international law enforcement, large sections of the Zeus C&C servers were physically taken out of service. Although the Zeus botnet remains only partially operational, its overall systems security remains intact on a node-by-node basis.

With continued proliferation of marginally or poorly protected and maintained Internet connected devices and software platforms, it is likely that, through the use of traditional technologies and methodologies, security postures globally will worsen. For example, within a single year, from May 2011 to May 2012, overall malware compromise rates increased by more than 1200%, indicating the already entrenched nation state actors and organized crime syndicates are unlikely to stray from established avenues of power and revenue. Furthermore, the now apparent cyber arms race currently under way with first-world nations is setting the stage for many possible Cold War-like scenarios which rely primarily on cyber weapons. Due to the increasingly connected nature of modern society, the effects of these conflicts are likely to be felt by citizens and economic markets first and foremost.

While impressive and necessary strides have been made in the defense against malware, the above-discussed common anti-malware techniques and technologies leave a clear gap between available computing system protection and anti-malware methods, and the ever evolving threat posed by malware authors and attackers. More fundamental, flexible, and cohesive methods to detect and remediate malware than what common anti-malware techniques and systems offer would be beneficial to mount a sufficient defense against APT.

To address this problem, the system 100 of FIG. 1 introduces the capability to provide behavioral model based identification, analysis and/or remediation of computing system security threats. There are many commonalities shared among strains, or families, of malware that provide an excellent basis to identify Advanced Persistent Threats (APT) and other malware through behavioral characteristics that are distinguishable from traditional anti-malware approaches, such as those discussed above. The system 100 at least partially uncovers and programmatically analyses these behavioral characteristics through the use of targeted real-time forensic analysis of malware during execution. By establishing reliable forms of behavioral modeling of a protected computing device and actively comparing behavioral characteristics of various processes to identify behavioral characteristics of malware, associated with, or related to malware, the system 100 facilitates an adaptive and immediately applicable remediation technique to combat current and future global APT.

To be effective, various malware exploit one or more vulnerabilities within a target system, be they within the underlying hardware, OS or application framework(s). To increase the chances of success, malware authors often include a number of avenues, or vectors, through which malicious code will be delivered. Despite the variations in sophistication, attack vector, chosen exploit method(s), and target systems or data, various malware have a number of common elements that, when processed by one or more components of the system 100, aid in identification and remediation.

For example, some commonalities among various malware include one or more of (1) the malware executes using resources allocated by, and shared with, the compromised system, (2) the malware includes at least one persistence mechanism that allows the malicious code to survive reboot and power events, and allows for resident execution within user or kernel space, or (3) the malware includes some form of a Command and Control (C&C) channel through which to receive updates, instructions and for exfiltration of stolen data.

These three elements shared among various malware represent an example basis for creating signature-free behavioral models that the system 100 uses against known and zero-day threats proactively, as the compromise and data theft are in motion, as opposed to reactive, anti-malware defenses and time-consuming post-compromise analysis practices.

As shown in FIG. 1, the system 100 comprises one or more user equipment 101a-101n (collectively referred to as UE 101) having connectivity to a malware identification platform 103, a malware remediation platform 107, and a malware defense platform 109 via a communication network 105.

In some embodiments, the UE 101's comprise, or are in communication with, UE memory 111a-111n (collectively referred to as UE memory 111). In some embodiments, the malware identification platform 103 is one or more of onboard, in direct communication with, or remote from, the UE 101. In some embodiments, the malware remediation platform 107 is one or more of remote from, a component of, or in direct communication with, the malware identification platform 103. In some embodiments, the malware remediation platform 107 is in communication with a malware information database 113. In some embodiments, the malware identification platform 103 is in direct communication with the malware information database 113.

By way of example, the communication network 105 of system 100 includes one or more networks such as a wired data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), WiGig, wireless LAN (WLAN), Bluetooth®, Internet Protocol (IP) data casting, satellite, mobile ad-hoc network (MANET), other suitable communication network or system, or any combination thereof.

The UE 101 is a computing device or system that is any type of mobile terminal, fixed terminal, or portable terminal including a mobile handset, station, unit, device, multimedia computer, multimedia tablet, Internet node, network node, satellite, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The malware identification platform 103 is configured to detect and react to various system events such as, but not limited to, file system events (e.g., kernel-level events such as events involving processes, threads, fibers, hardware components, hardware/software drivers, I/O activities, file system and entropy snapshots that occur on a protected UE 101), reads and writes (e.g. access or changes to data files) and changes to metadata. Such system events may be early indicators associated with data theft at the hands of malware. Unlike traditional anti-malware, which is focused only on executables, the malware identification platform 103 provides clear visibility of related data access (i.e., read or write activity). In some embodiments, the malware identification platform 103 passively (i.e., in a non-blocking fashion) monitors kernel-level events to maintain a minimal performance envelope making the malware identification platform 103 significantly scalable without endangering mission success or significantly affecting UE 101 performance, if at all.

Instead of making fruitless attempts to find and remediate malware which match a static list of signatures, the malware identification platform 103 monitors all file system activity and, at least partially, establishes the context around a data access by a given executable. To establish the context around a data access event, the malware identification platform 103 collects data such as behavioral indicators associated with, the who (e.g., a user or a process), the what (e.g., a file type), the where (e.g., file metadata), the when (e.g., system time), and/or the how (e.g., through which process a file was accessed) the data is accessed by the given executable. In some embodiments, the malware identification platform 103 is configured to similarly monitor hardware and network subsystems in parallel to the same end. The malware identification platform 103 then processes the various behavioral indicators of the data access context for a more complete analysis. The malware identification platform 103 identifies the process(es) that accessed protected data and recursively maps system resource relationships (e.g., Random Access Memory [RAM], disk, network and peripherals), hierarchical process relationships, and other relationships or information suitable for processing to identify a malicious threat and/or to develop a behavioral model associated with the UE 101 and/or a user thereof.

Using this relational information, and the contextual information, the malware identification platform 103 performs a scored evaluation of the behavioral indicators at hand, to determine the trustworthiness of the executable and its data access. The malware identification platform 103 compares the scored evaluation of the available behavioral indicators with an established "normal" behavioral model associated with the UE 101 as established by the malware identification platform 103. Establishing a normal behavioral mode across a system establishes the basis for trust policies to be implemented by the malware identification platform 103 giving a protected UE 101 the ability to determine whether a process, or collection of system objects, are behaving in an expected or normative manner. In some embodiments, the malware identification platform 103 determines a data access event or executable is abnormal if the comparison of the scored evaluation with the established normal behavioral model deviates from the established normal behavioral model by a predetermined degree or threshold value. In some embodiments, the malware identification platform 103 is configured to compare the gathered behavioral indicators and the relationships between systems objects, up to and including Inter-Process Communication (IPC), Remote Procedure Calls (RPC), and direct I/O between the UE 101 and directly connected hardware components or network, which lowers the risks of re-infection through network-based attack vectors.

Should the data access event and executable be deemed abnormal, the malware identification platform 103 creates forensically sound images of all related processes (e.g., RAM imaging), and files on disk (e.g., binaries, libraries, and other suitable files, data and transient data structures related to the identified malware). In some embodiments, before, during, or after creation of the forensically sound images, the malware identification platform 103 isolates or quarantines all system objects associated with a suspicious or abnormal data access event or system process. For example, the malware identification platform 103 is configured to effectively isolate, terminate and/or remove a suspect process and identify related mutexes, memory allocations, files on disk, and I/O buffers. In some embodiments, the malware identification platform 103 also isolates, terminates and/or removes the identified related mutexes, memory allocations, files on disk, and I/O buffers. Upon completion of the mapping and imaging, the malware identification platform 103 executes a remediation of the malicious processes, related software on disk, and persistence mechanisms that may allow the malware to return. In some embodiments, the malware identification platform 103 processes the forensic images after the remediation process. In other embodiments, the malware identification platform 103 processes the forensic images in parallel with the remediation process to conserve time.

In processing the forensic images, the malware identification platform 103 performs an array of automated forensic tasks that extract further identifying behavioral indicator information from the images to capture the malware "live" or in real-time in RAM, for example. The invaluable live forensic images are processed by the malware identification platform 103 in an effort to extract Indicators of Compromise (IOCs) such as, but not limited to, keywords, encryption keys, malware Command and Control (C&C), data drop addresses, and other metadata useful in identifying the source and intended target(s) of a compromise. Capturing the malware live in RAM allows for unfettered access to its intricacies and avoids the often stifling process of defeating packing and various forms of polymorphism. Unlike traditional malware signatures, the Indicators of Compromise (IOC) identified through forensic image processing provide an incremental, rather than absolute, approach to determining trustworthiness of a given data access event.

These system generated IOCs are capable of being used for algorithmic decision-making across other protected UE 101's or entire networks using different or layered contexts. For example, the malware identification platform 103 is configured to convert the generated IOC's to a mathematical representation to score a generated behavioral fingerprint or model of the UE 101 at a given time against a known baseline or normal behavioral model. In some embodiments, the malware identification platform 103 is configured to include a temporal component in the behavioral model and abnormal process determination that accounts for frequency and time deltas between related events to allow for making highly accurate decisions regarding the trustworthiness of a given software process or series of events.

The malware identification platform 103 correlates and transforms resulting metadata into actionable host and network defense information. For example, the malware identification platform 103, in some embodiments, is configured to share and cause a centralization of the combinations of C&C or data drop host addresses (Internet Protocol and/or Fully Qualified Domain Names [FQDNs], such as evil.co.cn), Universal Resource Indicators (URIs, such as http://evil.cn.co/malware/apt1.php), file names or hashes and other unique attributes among other protected UE 101's and other infrastructure elements, including switches, routers and firewalls, to proactively defend against other (dormant) compromises that share similar attributes.

Accordingly, in some embodiments, the IOCs are immediately communicated to and shared with the malware remediation platform 107. The malware remediation platform 107, in turn, provides a unique and proactive protection for other UE 101's such as, but not limited to, various other computing devices, network hosts, servers, and/or network infrastructure. This orchestrated process ensures that invaluable malware binary information is captured and analyzed in real-time, minimizing the window of exposure organizations have to zero-day threats.

In some embodiments, the malware remediation platform 107 is configured to be a centralized repository of behavioral indicators or behavioral telemetry, temporal correlation, and security posture assessment. For example, in networked or remote applications that involve one or more remote or mobile UE 101's that comprise mobile devices, satellites, remote computing systems, or various network components or nodes, the malware remediation platform 107 is configured to maintain excellent visibility of activities among the remote UE 101's.

In some embodiments, the malware remediation platform 107 collects and analyzes real-time received streams of behavioral telemetry from each protected UE 101 and is configured to be the primary point of decision-making that deems object-level events to be trustworthy or otherwise. In some embodiments, the malware identification platform 103 communicates determined behavioral telemetry via constant stream or periodic bursts having a data transmission rate between about 60 Kbps and about 80 Kbps under normal operating conditions and between about 80 Kbps and about 120 Kbps under periods of heavy system load (on a per-device basis). In some embodiments, the data rates are higher, while in other embodiments, the data rates are lower. In some embodiments, variability in the data rates exist, so the malware identification platform 103 is configured to limit the data rate based, for example, on UE 101, malware remediation platform 107, or communication network 105 capabilities.

In the event of a suspected compromise (i.e., a determination that a certain process is a malicious process), the malware remediation platform 107 is configured to, or at least make it possible to, remediate the suspicious process, further monitor the process and perform the automated forensic analysis, and/or ignore and log the activity based on predetermined rules and action criteria.

In embodiments that involve a malware remediation platform 107 that is configured to be the primary decision-making platform to, for example, conserve UE 101 system resources, or to make it possible for the UE 101 to be secure from malicious processes without being fully capable of operating any or all of the malware identification platform 103 and the malware remediation platform 107, the malware remediation platform 103 is configured to be dormant and to only become active upon receiving an authenticated remediation directive from the malware remediation platform 107. Similarly, the malware identification platform 103, in some embodiments that involve a remote malware remediation platform 107, remains dormant and only becomes active upon receiving an authenticated forensic analysis directive from the malware remediation platform 107.

In some embodiments, the malware remediation platform 107 is configured to store, or cause to be stored, malware identification related behavioral information or characteristics that include, for example, forensic event logging, malware images, metadata, and IOCs in one or more of the malware information database 113 or the UE memory 111. In some embodiments, the malware identification platform 103 is configured to store, or cause to be stored, malware identification related behavioral information or characteristics that include, for example, forensic event logging, malware images, metadata, and IOCs in one or more of the malware information database 113 or the UE memory 111.

This stored malware identification related behavioral information is invaluable for the proactive protection of other UE 101's, computing devices, hosts, servers, and network infrastructure. In some embodiments, the stored malware identification related information is made available globally via an anti-malware cyber intelligence feed that facilitates sharing and querying of data stored in the malware information database 113 as instructed, or allowed by, the malware remediation platform 107 by way of the communication network 105. For example, in some embodiments, a malware telemetry provided by the malware identification platform 103 is immediately shared with other UE 101's having, running, or having connectivity to, the malware identification platform 103. Instead of awaiting another compromise, the system 100 makes it possible for all protected UE 101's to immediately begin proactively scanning for the newly developed IOCs. This unique and powerful automated network defense framework allows a single zero-day malware event to potentially trigger a global remediation response within seconds or minutes.

The malware defense platform 109 is a platform specific module that runs directly on various network infrastructure components such as routers, switches, firewalls, Intrusion Prevention Services (IPS), or other suitable network infrastructure components. Although not all such devices have application payload awareness of network traffic, network infrastructure components can be configured or caused to play a role in defending against malware. Based on the capabilities of a given network infrastructure component, the malware defense platform 109 causes, at least in part, the given network infrastructure component to block, further inspect, or redirect suspect traffic away from vulnerable UE 101's. This unique approach of utilizing existing network components as an additional layer of defense against malware provides significant and measurable value and protection.

Software Defined Networks (SDN) make it possible to converge disparate network functions onto a single network or protocol (e.g. IP Voice and Video on commodity Ethernet networks). An increased protocol-level awareness, or generally speaking the 'visibility', compared to conventional networking makes achieving this convergence of disparate network functions possible.

In some embodiments, the malware identification platform 103 and at least the malware defense platform 109 are configured to leverage lightweight software layers integrated into traditional application and protocol stacks to provide complete application and content awareness to traditional networks and SDN's, to enable intelligent network applications and functionality. For example, in some embodiments, based on defined mission parameters including timestamp, geolocation and image deltas, the malware identification platform 103 and/or the malware defense platform 109 are configured to cause a UE 101 such as a tactical satellite to dynamically route critical images (purely via IP) directly to any number of other UE 101's operated by, for example, field personnel without time-consuming human intervention or oversight by simply leveraging a lightweight metadata framework built by the malware identification platform 103 and communicated to commodity IP network components by the malware defense platform 109.

In some embodiments, Software Defined Networks (SDN) managed and/or monitored by the malware identification platform 103 and the malware defense platform 109 make it possible to provide a programmable layer among all UE 101's (physical and virtual) in a given network to create dynamic and/or temporary virtual networks. To facilitate the creation of dynamic and/or temporary virtual networks, the malware identification platform 103 is configured to extracting the control plane of a network such as by generating a behavioral model of the monitored network. Dynamic and/or virtual networks support multi-tenant environments, research networks, or experimental network protocols that are sometimes harmful or overwhelming to the stable operation of traditional network traffic. By extracting the control plane, which is traditionally run and managed separately on each network component, the malware identification platform 103 is configured, in some embodiments, to intelligently interact with the network as a whole for management, monitoring and orchestration purposes by way of, for example, the malware defense platform 109.

SDN's sometimes face backwards compatibility issues, cross-vendor interoperability, and most importantly 'killer apps'. As such, in some embodiments, the malware identification platform 103 and the malware defense platform 109 are configured to ensure backward compatibility to multicast-unfriendly environments (i.e., unicast-to-multicast (and vice versa) translation capabilities) to allow unicast-only hosts to seamlessly participate in group communication. For example, in some embodiments, the malware identification platform 103 is configured to generate a multicast encryption key via a key generation and exchange protocol that is configured to use generally available information from the network environment such as determined behavioral indicators or metadata that can be used to establish multi-point Internet Protocol Security (IPSec) tunnels (without relying on Pre-Shared Keys).

In some embodiments, the malware identification platform 103 is configured to provide content awareness and to determine true traffic payload of a monitored network to enable real-time communications and High Performance Computing (HPC). For example, the malware identification platform 103, in some embodiments, is configured to overlay intelligent routing and security functionality with minimal impact on a monitored network without changing the topology or vendor of an existing network, thereby enabling commodity networks and SDNs to be intrinsically aware of traffic content, without heavy computational requirements. Based on determined traffic and content, the malware identification platform 103 is configured to translate real-life, contextual information such as location, time, movement and environmental factors directly into IP network attributes that can then be leveraged for intelligent decision-making based on defined or emerging policies.

Because the malware identification platform 103 collects various behavioral information which is capable of providing the above-discussed traffic payload and content awareness, traditional Quality of Service (QoS) tagging mechanisms that can be easily compromised by malicious attackers such as Differentiated Service Code Point (DSCP) that coarsely identify a type of traffic (e.g., as HTTP or SMTP) so as to classify and control bandwidth utilization and queuing priority may be avoided. Additionally, Deep Packet Inspection (DPI), a process that is typically applied to inspect each packet beyond protocol headers to determine the type of content contained within may also be avoided. Traditional DPI platforms must be in the traffic path (which often causes a performance bottleneck), tend to increase end-to-end latency (due to additional processing complexity), and do not scale linearly (often causing long-term problems as networks expand), thereby reducing a network's overall performance.

By way of example, the UE 101, malware identification platform 103, malware remediation platform 107, and malware defense platform 109 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
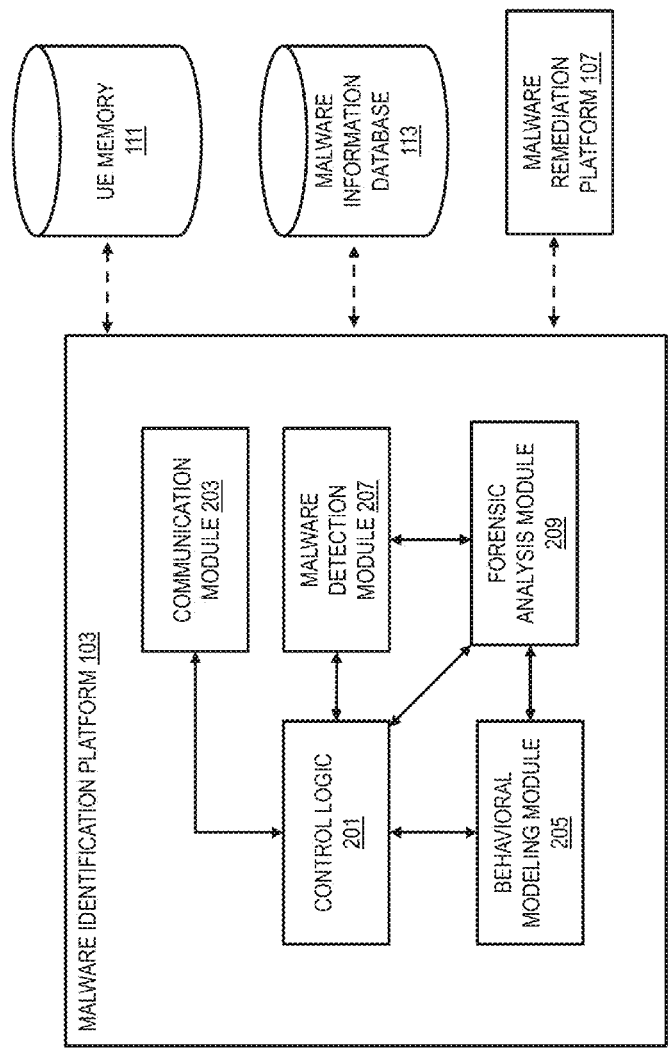
FIG. 2 is a diagram of the components of a malware identification platform, in accordance with one or more embodiments.

FIG. 2 is a diagram of the components of malware identification platform 103, according to one embodiment. By way of example, the malware identification platform 103 includes one or more components for providing behavioral model based computing system security. It is contemplated that the functions of these components may be combined in one or more components or performed by other components of equivalent functionality. In this embodiment, the malware identification platform 103 includes a control logic 201, a communication module 203, a behavioral modeling module 205, a malware detection module 207, and a forensic analysis module 209.

In some embodiments, the malware identification platform 103 communicates with the UE 101 (FIG. 1), the malware remediation platform 107, the UE memory 111, and/or the malware information database 113, either directly or indirectly, via the communication module 203. The control logic 201 causes data received by way of the communication module 203 to be processed by the behavioral modeling module 205, the malware detection module 207, and/or the forensic analysis module 209. The control logic 201 additionally causes results yielded by the various processes conducted by the behavioral modeling module 205, the malware detection module 207, and/or the forensic analysis module 209 to be communicated to one or more of the UE 101, the malware remediation platform 107, the UE memory 111, or the malware information database 113 by way of the communication module 203.

In some embodiments, the behavioral modeling module 205 is configured to detect and react to various system events indicated by data collected or received by the malware identification platform 103 via the communication module 203 such as, but not limited to, file system events, reads and writes (e.g. access or changes to data files) and changes to metadata. These system events may indicate the presence of malware on or accessing a protected computing system or protected data. The behavioral modeling module 205 provides clear visibility of related data access (read or write activity) as opposed to being solely focused on executables. The behavioral modeling module 205 monitors all file system activity and, at least partially, establishes the context around a data access by a given executable. To establish the context around a data access event, the behavioral modeling module 205 collects data such as, the who (e.g., a user or a process), the what (e.g., a file type), the where (e.g., file metadata), the when (e.g., system time), and/or the how (e.g., through which process was a file accessed) the data is accessed by the given executable to generate various indicators of the data access context. The various indicators of the data access context are used by the behavioral modeling module 205 to develop the normal behavioral model of the UE 101. Later collected indicators of data access are processed and compared to the normal behavioral model, either individually, as a whole, or in relation to other available system behavioral data, for example.

The control logic 201 causes the various indicators of the data access context determined by the behavioral modeling module 205 to be communicated to and shared with the malware detection module 207.

The malware detection module 207 processes the various indicators of the data access context. The malware detection module 207 identifies the process(es) that accessed protected data and recursively maps system resource relationships (e.g., RAM, disk, network and peripherals), hierarchical process relationships, and other relationships or information suitable for processing to identify a potential malicious threat.

Using this relational information, and the contextual information, the malware detection module 207 performs the scored evaluation of the behavioral indicators to determine the trustworthiness of the executable and its data access. The malware detection module 207 compares the scored evaluation of the available behavioral indicators with the established "normal" behavioral model associated with the system UE 101. In some embodiments, the malware detection module 207 determines a data access event or executable is abnormal if the comparison of the scored evaluation with the established normal behavioral model deviates from the established normal behavioral model by a predetermined degree or threshold value.

Should the data access event and executable be deemed abnormal, the malware detection module 207 creates forensically sound images of all related processes (e.g., RAM imaging), and files on disk (e.g., binaries, libraries, and other suitable files or data). Upon completion of the mapping and imaging, the malware detection module 207 executes the remediation of the malicious processes, related software on disk and persistence mechanisms that may allow the malware to return.

The control logic 201 causes the forensic images generated by the malware detection module 207 to be communicated to and shared with the forensic analysis module 209 for processing. In some embodiments, the forensic analysis module 209 receives the forensic images to facilitate processing of the forensic images after the remediation process. In other embodiments, the malware detection module 207 is caused to communicate and share the forensic image with the forensic analysis module 209 before or during the remediation process to facilitate processing of the forensic images by the forensic analysis module 209 in parallel with the remediation process to conserve time.

In processing the forensic images, the forensic analysis module 209 performs the array of automated forensic tasks that extract further identifying information from the images to capture the malware "live" or in real-time in RAM, for example. The forensic analysis module 209 determines the Indicators of Compromise (IOC) by processing the forensic image. The forensic analysis module 209 generated IOC's provide an incremental, rather than absolute, approach to determining trustworthiness of a given data access event. These system generated IOCs are capable of being used for algorithmic decision-making across other protected hosts or entire networks using different or layered contexts.

In some embodiments, the malware identification platform 103 is coupled with traditional application whitelisting and code signing mechanisms by way of the communication module 203. Such coupling makes it possible to share determined instances of malware between the malware identification platform 103 and other traditional applications to increase overall efficacy of the malware identification platform 103 and/or the traditional applications to which the malware identification platform 103 is coupled.

Figure 3:
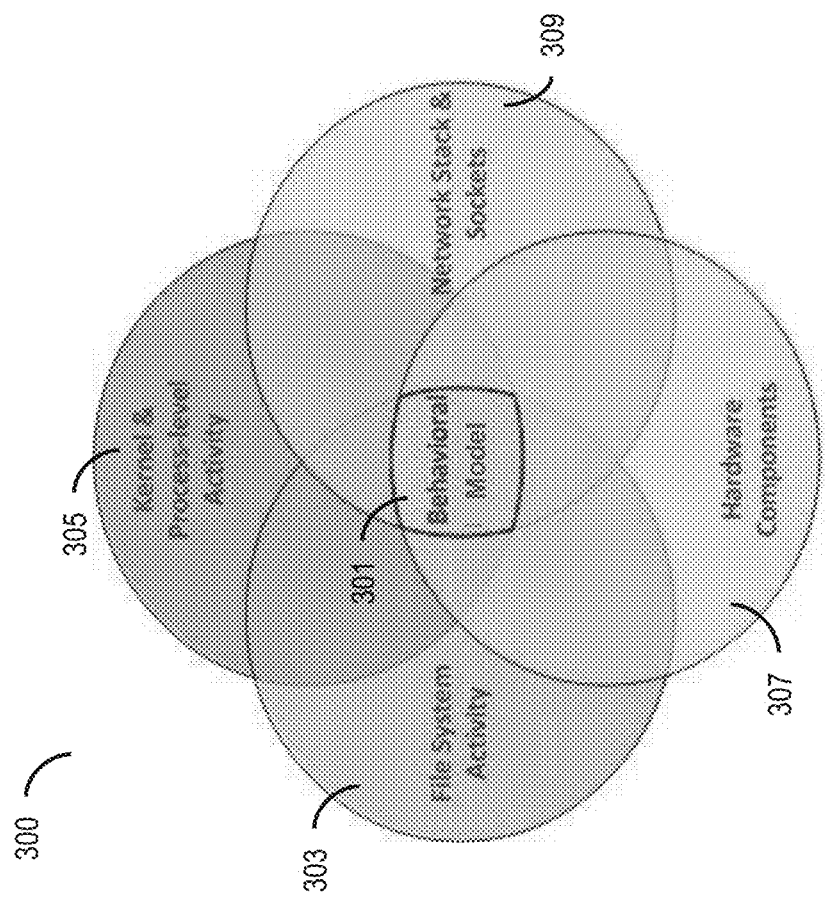
FIG. 3 is a diagram illustrating the overlapping relationships between data types and the establishment of a behavioral model, in accordance with one or more embodiments.

FIG. 3 is a diagram illustrating the overlapping relationships between data types and the establishment of a behavioral model or behavioral fingerprint, in accordance with one or more embodiments.

The malware identification platform 103 (FIG. 1) generates a behavioral model 301 using, for example, the behavioral modeling module 205 (FIG. 2) to be used in the determination of whether a process is abnormal and should be identified as a malicious process. The malware identification platform 103 generates the behavioral model 301 using data that is often ignored. For example, the massive amount of metadata 300 contained within modern Operating Systems (OS) collectively make it possible to protect increasingly interconnected systems in a much more complete and sustainable fashion compared to traditional signature-based technologies.

The malware identification platform 103 identifies the direct, indirect, temporal and volumetric relationships of many metadata 300 elements (e.g., describing system objects processes, file system blocks/files, network socket, or other suitable system information) to establish a state of being, or behavior, of a protected computing device or system (e.g., UE 101 [FIG. 1]). By first creating a framework to measure and record metadata 300 elements within a given UE 101, the malware identification platform 103 establishes a behavioral model 301 for expected or normative behavior of the protected UE 101 as a whole.

Using the resultant behavioral model 301 as a reference for real-time parametric analysis, the malware identification platform 103 deterministically rates emergent system activities as normative, or otherwise, thereby generating a statistical trust 'score' for each system event (e.g., a software process opening a file on disk). Within a security context, the malware identification platform 103 uses generated behavioral models 301 to detect the activities of advanced malware and other Advanced Persistent Threats (APT) without relying on static signatures and heuristics. Although the structure, especially of highly obfuscated and polymorphic malware, and cryptographic checksums will differ from variant to variant, the underlying behavior will invariably be identifiable because various user-space programs have unique behavioral fingerprints 301 that are characteristic of a program's underlying system-wide relationships, activities and quirks.

In some embodiments, the malware identification platform 103 is configured to combine several different domains of metadata 300 to establish the behavioral model 301. Example metadata domains include, but are not limited to, file-system activity 303, kernel and process-level activity 305, hardware components 307, and network stacks and sockets 309.

In use, the malware identification platform 103 uses the behavioral modeling module 205 to provide complete visibility of related metadata 300 elements within a protected computing device or system such as UE 101, allowing for the rapid and accurate behavioral evaluation of events in real-time. The behavioral modeling module 205, for example, is configured to maintain lightweight collections of metadata 300 elements (e.g., in the UE memory 111 or the malware information database 113) to evaluate the behavior of a protected device or system against established temporal, volumetric, or other complex models.

Figure 4:
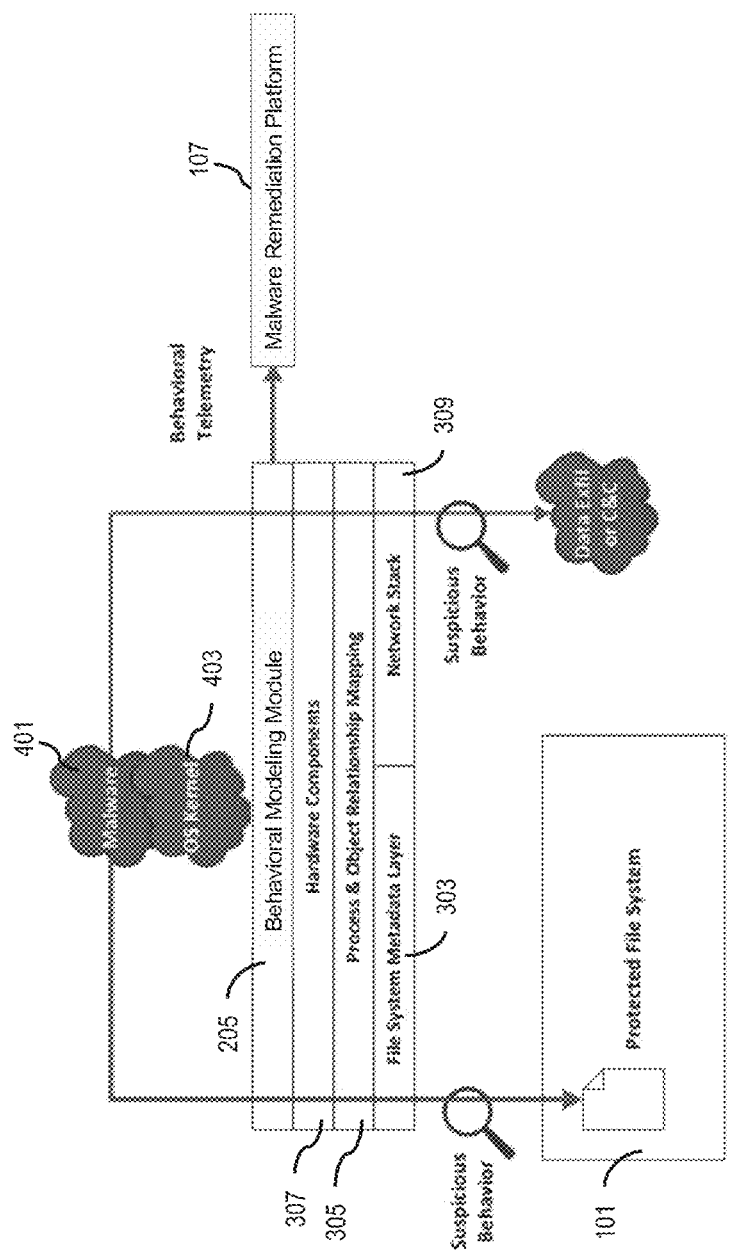
FIG. 4 is a diagram illustrating the relationships between example metadata element domains, a protected system, and the behavioral modeling module, in accordance with one or more embodiments.

FIG. 4 is a diagram illustrating the relationships between example metadata element domains, a protected system, and the behavioral modeling module, in accordance with one or more embodiments.

A malicious software process 401 related to a piece of data-stealing malware may exhibit pseudo-random file system access of user-generated files (e.g., searching for specific data, such as SSNs or credit card numbers) of a protected computing device or system such as UE 101. The behavioral modeling module 205 is configured to determine the emergent behavior of an unrelated user-space program (i.e., unrelated to the targeted file types, such as MS docx) accessing many such files over a short period of time. Such unrelated user-space programs do not individually appear to be malicious to traditional security technologies that consider various file activities as individual activities, because traditional anti-malware security applications fail to consider the behavioral relationships between multiple file activities. Conversely, the behavioral modeling module 205 makes it possible for the malware identification module 103 to detect malware by combining real-time event analysis with more complex temporal and volumetric behavioral modeling without static signatures and heuristics.

In some embodiments, to avoid the degradation of accuracy or relevance of a given generated behavioral model 301 (FIG. 3), the valuable metadata 300 (FIG. 3) collected by the behavioral modeling module 205 is collected and used as the basis to a refinement feedback loop or training mode. For example, in some embodiments, the introduction of a new user space program or system driver to a protected UE 101 would bring with it new metadata 300 and potentially new emergent behaviors and valuable metadata 300. Rather than continuing to compare this potentially new behavior to an existing behavioral model 301, the behavioral modeling module 205 is configured to continually update generated behavioral models 301 by capturing any updated or new metadata 300.

In some embodiments, the behavioral model 301 takes the form of a binary file containing one or more of (1) pre-computed statistical tables for the presence, occurrence or relationship(s) among the various metadata 300 elements, and at least the example behavioral domains (i.e., file-system activity 303, kernel and process-level activity 305, hardware components 307, and network stacks and sockets 309), (2) hardware topology, or (3) network socket topology.

In some embodiments, host-specific portions of the behavioral model 301, specifically those for hardware, temporal and volumetric behaviors include one or more of (1) historical re-computed statistical tables for the presence, occurrence or relationship(s) among the various metadata 300 elements, and at least the example behavioral domains (i.e., file-system activity 303, kernel and process-level activity 305, hardware components 307, and network stacks and sockets 309), (2) current hardware topology, or (3) current network socket topology.

In some embodiments, some behavioral model 301 files are separately stored or managed by the behavioral modeling module 205 from the host-specific portions of the behavioral model to ensure sane handling of the host-specific items that have potentially high turnover rates, and to minimize data corruption or disk contention issues.

In some embodiments, the behavioral modeling module 205 is configured to have various OS kernel and commonly used software library functions hooked-in to the behavioral modeling module 205 in a pass-through mode. This coupling of various OS kernel and commonly used software library functions makes it possible for the behavioral modeling module 205 to achieve unparalleled levels of visibility into underlying OS operations. As such, the behavioral modeling module 205 is configured to determine the relationships among various software processes, software libraries, handles and many emergent activity patterns for inclusion in the generation process of the behavioral model 301.

In some embodiments, the behavioral modeling module 205 is configured to actively collect and track process-level attributes that include, but should not be considered to be limited to, one or more of (1) raw data for process relationship mapping, (2) historical raw data for relationship mapping, and (3) derived relationships.

Some examples of raw data for process relationship mapping include Executable (raw path), Execution Environment Variables, Original Parent Executable (raw path; nullable), Parent Executable (raw path), Owner (UID:GID), Current Execution Timestamp (epoch), Runtime (wall clock), Hash (complete and piecewise cryptographic of executable), Open File Handle(s), Disk IO (bytes), Open Network Socket(s) (SRC Port:DST Port, SRC IP:DST IP), Network IO (bytes), Direct Library Relationships (raw path), File Type (Custom implementation of 'file'), and Associated Registry Hive(s) (Windows Only).

Some examples of historical raw data for process relationship mapping include Executions Since Boot (integer), Prior Execution Timestamps, Prior Owner(s) (UID:GID), Prior Runtime (wall clock), Prior Execution Environment Variables Prior Parent Executable (raw path;nullable), Hash (MD5 of executable), Prior Open File(s), Prior Disk IO (bytes), Prior Open Network Socket(s), (SRC Port:DST Port, SRC IP:DST IP), Prior Network IO (bytes), Prior Direct Library Relationships (raw path), Prior File Type (Custom implementation of 'file'), and Prior Associated Registry Hive (s).

In some embodiments, the attributes are processed individually and, where possible, as fully meshed relationships using Spectral Clustering and other Machine Learning (ML) algorithms. The behavioral modeling module 205 is configured to keep more complex metadata 300 elements, especially those of the temporal and volumetric persuasion, as raw collections for various processes and determinations related to assessing one or more relationships among the collected metadata elements such as custom delta (time/volume/destination), occurrence, and Entropy (e.g. Execution Environment Variables) for generating the behavioral model 301.

Some examples of derived relationships include Executable:Parent, Parent File Type:Executable File Type, Owner: Executable, Executable:Timestamp, Timestamp:Executable (Collection, non-ML analysis), Executable:Runtime, Executable:Hash, Executable:Executable Type, Executable:Open File Type, Executable:Library, Executable:Path, Executable: Environment Variables (Collection, non-ML analysis), Executable:Registry Key(s) (Collection, non-ML analysis), Executable Type:Open File Type, Executable:All Other Active Executables (Collection, non-ML analysis), Executable:Network Socket, Executable:Disk IO (Collection, non-ML analysis), and Executable:Network IO (Collection, non-ML analysis).

In some embodiments, the behavioral modeling module 205 causes the results of each processing run, which include unique occurrence frequencies of the above-discussed metadata elements 300 to be numerically summarized (e.g. 0.81, 0.15, 0.04) and stored on one or more of the UE memory 111 or the malware information database 113 as dictionaries, allowing for efficient handling when the behavioral model 301 is generated.

In some embodiments, the behavioral modeling module 205 is configured to not only collect data regarding the topology of attached hardware components 307, but also a reported identity, driver association, and computational capabilities of the attached hardware components 307. Based on the configured trust level of a given deployment, the behavioral modeling module 205 detects and reacts to suspicious changes to the hardware/bus topology of a given UE 101 and also identifies changes to low-level changes to hardware, software, and memory relationships, and activities.

In some embodiments, the malware identification module 103 by way of the malware detection module 207 (FIG. 2) executes synthetic and pseudo-random transactions to probe the authenticity, or trustworthiness, of individual hardware components. For example, the malware identification module 103 is configured to directly monitor CPU, GPU, encryption accelerators, and storage adapters. Although rare, compromises involving hardware components can be among the most damaging and difficult to detect/remediate of all advanced malicious intrusions. The behavioral modeling module 205, accordingly, makes it possible for the behavioral model 301 to be used to maintain visibility of the hardware 307 metadata 300 attributes/relationships such as, but not limited to, one or more of (1) hardware metadata monitoring, (2) historical hardware metadata monitoring, or (3) derived relationships.

Some example hardware 307 metadata 300 attributes/relationships that are monitored included, Individual bus topologies, Bus ID, Driver File(s), Streams, Named Pipes & other attached IO redirection, Hardware component first-seen time (epoch), Hardware component last-seen time (epoch), Hardware component serial number, and Hardware component entropy (derived; customer collection/dictionary).

Some example historical hardware metadata that are monitored include Individual bus topology changes, Streams, Named Pipes & other attached IO redirection, Hardware component presence, every occurrence (epoch), and Hardware component entropy (derived; customer collection/dictionary).

Some example Derived Relationships include Bus ID:Hardware component ID, Hardware component ID:Driver File(s), Hardware component:File Handle(s), Hardware component:Open File(s), File Handle Chain:Hardware Component ID, and Synthetic transaction capability: Most Recent Transaction Result.

In some embodiments, the malware detection module 207 is configured to identify and disconnect or disable determined untrusted or malicious hardware components based on the behavioral model 301 generated by the behavioral modeling module 205. In some embodiments, the behavioral monitoring module is configured to extrapolate hardware component 307 metadata 300 elements specialized components such as FPGAs, ASICs, BIOS, or other mission critical hardware, and the malware detection module 207 is configured to remediate a determined untrusted or malicious hardware component based on the behavioral model 301 at least by disabling or disconnecting the untrusted or malicious specialized component.

In some embodiments, the behavioral modeling module 205 is configured to process and correlate various cross-domain relationships that provides unique, and often ignored, perspective on not only data-stealing malware, but also an on-disk footprint of even the stealthiest malware.

For example, the behavioral modeling module 205 is configured to track all file system events, such as file creation, modification deletions, and streams to establish behavioral links to software processes and files, user ownership, and even changes to file system layer metadata 303 (e.g. permission bitmaps).

File system metadata 303 helps to establish the trustworthiness of actively executing software processes. From a forensic point of view, this same data is usable to help map even the most infrequent and obscure activities of advanced malware, such as the forensic mapping performed by the malware detection module 207 and/or the forensic analysis performed on the forensic mapping by the forensic analysis module 209 (FIG. 2).

The file system metadata 303 and derived relationships therefrom include, but should not be considered limited to, one or more of (1) raw data for file system relationship mapping, (2) historical data for file system relationship mapping, or (3) derived file system relationships.

Some examples of raw data for file system relationship mapping include File (raw path), File Hashes (MD5/SHA1/SHA256/SHA512 of file), Executable Hashes (MD5/SHA1/SHA256/SHA512 of associated executable), Associated executable (raw path), File Type (custom implementation of 'file'), Owner (UID:GID), Permissions (bitmap), File Descriptor (path, flag, mode), Open Timestamp (epoch; nullable, may not be known), Interim 'ATIME' Timestamp (epoch; nullable, may not be known), Close Timestamp (epoch), and File:Executable Environment Variables.

Some examples of historical data for file system relationship mapping include File:User:Open Time(s) (epoch), File:User:Modify Time(s) (epoch), File:User:Delete Time(s) (epoch), File:Executable, and File:Executable Environment Variable.

Some examples of derived file system relationships include File:Owner(s), File:Group(s), Open File:Executable, File:Timestamps (MAC times, epoch), File Type:All Expected Executables, File:Access Frequency (n/time), File:Modification Frequency (n/time), File:Access Timeframe (absolute representation in epoch milliseconds), File Type: Expected Location, Open File:Executable:Network Socket (custom, non-ML), Open File:Executable:SRC IP:DST IP (custom, non-ML), File:Alternate Location(s) on Disk, File:Alternate Identities on Disk, File:Permissions (bitmap) Modifications, and File:Executable Environment Variables.

In some embodiments, the behavioral modeling module 205 is configured to enhance the effectiveness, or sensitivity, of the behavioral model 301 by, for example, tuning it to skew toward a lower trust level as established by the malware detection module 207 when monitoring certain file system locations that contain particularly sensitive data. In some embodiments, as a default, the behavioral modeling module 205 views all file system locations as equal in terms of globally configured trust values, but the behavioral modeling 205 is configurable to increase behavioral sensitivity with respect to mission-critical environments that might benefit from the increased behavioral sensitivity.

In some embodiments, the behavioral modeling module 205 is configured to monitor and collect invaluable network metadata 309. Network metadata 309 is typically viewed as extraneous for security information and event management (SIEM) and broad correlation platforms that have little or no host-side visibility. This leaves conventional computing system security applications ineffective in relating process-level activities to the network itself. This lack of end-to-end visibility provides advanced malware the perfect opportunity to disguise malicious activities as benign HTTP traffic, for example, that is often encrypted and out of reach for Deep Packet Inspection (DPI) and many web security technologies.

Based on the monitored and collected network metadata 309, the malware detection module 207 is configured to proactively perform the forensic mapping of malicious activities. In some embodiments, the behavioral modeling module 205 monitors the network stack of protected hosts, e.g. UE 101's, to provide the network metadata 309.

The network metadata 309 includes, but should not be considered limited to, one or more of (1) network metadata monitoring, (2) historical network metadata monitoring, or (3) derived relationships.

Some example network metadata monitoring includes Network interface attributes, Network interface events, Interface BIOS attributes (if present), L2 Adjacencies (ARP table), L3 paths (host routes), Associated buffer file handle(s), Buffer utilization level(s), and Socket-level events.

Some example historical network metadata monitoring includes Changes to network interface attributes, Changes to network interface BIOS attributes (if present), L2 Adjacencies (ARP table), L3 paths (host routes), Socket-level events, and Network entropy attributes.

Some example derived relationships include Physical:Virtual network interface topology, Executable:Socket, Open File:Executable:Socket:SRC IP:DST IP (custom, non-ML), Network Entropy:Payload Volume Analysis (custom, partial-ML), Network Entropy:Time Delta Analysis (custom, partial-ML), Network Entropy:Destination Distribution Analysis (custom, partial-ML), and Physical interface events.

In some embodiments, all of the metadata 300 parametric analyses discussed above are consolidated and used as the reference behavioral model 301 to accurately detect suspect and malicious processes based on a predetermined degree of deviation from the behavioral model 301 and any detected processes that attempt to access data associated with a protected computing device such as UE 101, as determined by the malware detection module 207 (based on determined behavioral characteristics individually, tangentially, or as a whole).

The combination of the behavioral model 301 with one or more underlying filtering algorithms makes it possible for the behavioral modeling module 205 and the malware detection module 207 to maintain active and continually updating behavioral 'scores' focused on each active software process, allowing for lightweight numerical comparisons to determine the trustworthiness of a given process.

Figure 5:
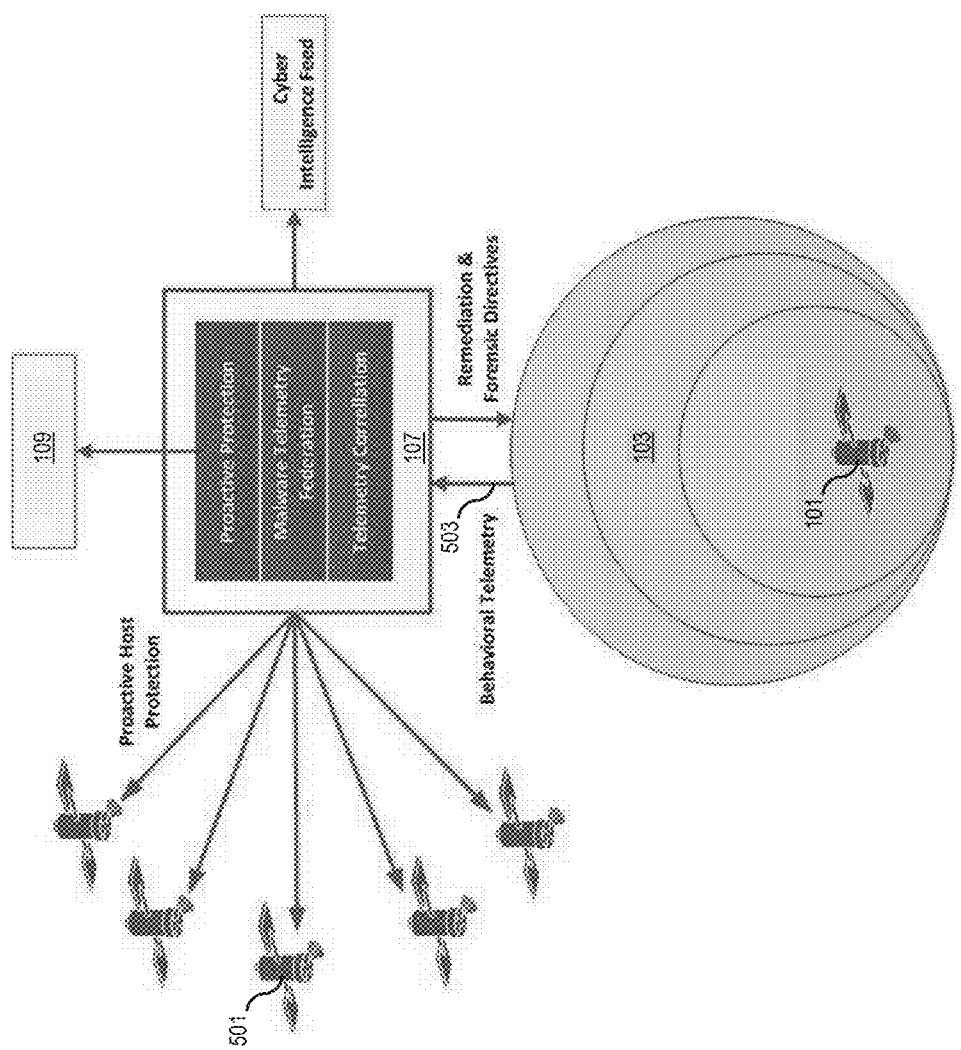
FIG. 5 is a diagram of a satellite system capable of providing behavioral model based identification, analysis and/or remediation of computing system security threats, in accordance with one or more embodiments.

FIG. 5 is a diagram of a satellite system 500 capable of providing behavioral model based computing system security, in accordance with one or more embodiments.

In some embodiments, the malware identification platform 103, the malware remediation platform 107, and the malware defense platform 109 are configured to provide behavioral model based malware defenses for satellites 501 via a cross-platform, lightweight defensive software framework that operates autonomously and free of static signature and heuristics that plague obsolete security technologies such as those discussed above. In this example embodiment, the UE 101 is a satellite and other UE 101's are satellites 501.

Protection of on-orbit assets from sophisticated malware cyber attacks is a challenging problem. Conventional malware protection technologies are challenged to address the embedded nature of satellite systems. Additionally, attackers are likely to employ non-traditional methods to attack these assets.

The above-discussed blended approach of generating and applying behavioral model 301 with an automated forensic analysis technique that provides granular visibility of system objects (software or hardware), as well as a temporal context around a set of system events makes it possible to identify software and network-borne threats and exposes the behavior and indelible nature of malware and malicious activities. This same approach is applicable to secure space-based assets, FPGAs, servers, applications, and networks.

In some embodiments, the behavioral modeling, establishment of context and trust, real-time forensic analysis, and telemetry correlation capabilities of the malware identification platform 103 are largely centralized to each protected host or computing device such as UE 101, in part as a method of fostering autonomous and maintenance-free operations. This method of deployment is efficient and effective for devices with reasonable computational resources (CPU, RAM & network connectivity) but, within embedded systems such as satellites 501, SCADA components or other platforms with limited computational capabilities such as some mobile devices, a proper balance between security protection and deterministic performance is beneficial to yield effective device operation with an ample degree of security from malicious processes.

As discussed with respect to FIG. 1, the malware identification platform 103 is capable of being onboard and/or remote from the UE 101. As such, security protection and performance by physical and logical separation of resource-intensive operations (e.g., telemetry correlation and real-time forensic analysis) from the satellite 501 (or other embedded system) makes it possible to protect computing systems such as satellites 501 that may lack sufficient resources or the capabilities to completely, or even partially host, the malware identification platform 103 and/or facilitate any or all of the processes the malware identification platform 103, the malware remediation platform 107 and/or the malware defense platform 109 conduct.

Accordingly, in some embodiments, the malware identification platform 103 is configured to communicate behavioral telemetry from a protected computing device such as UE 101 to a terrestrial data center in real-time for processing and correlation by way of a behavioral telemetry stream 503. The terrestrial data center, for example, is configured to host the malware remediation platform 107 remotely from the UE 101. By processing and correlating the behavioral telemetry data at a remotely from the UE 101, it becomes possible to safely and effectively overlay the comprehensive security framework provided by the malware identification platform 103, malware remediation platform 107, and malware defense platform 109 on both new and existing space-based (e.g., satellites 501) and other mobile devices.

In some embodiments, the behavioral telemetry stream 503 is a steady state data stream of about 25 Kbps to about 35 Kbps under normal operating conditions. Under periods of heavy system load, the behavioral telemetry stream is a steady state data stream of about 55 Kbps to about 65 Kbps (on a per-satellite basis). In some embodiments, the steady state data stream is at a higher data rate. In other embodiments, the steady state data stream is at a lower data rate. Although variability will naturally exist, in some embodiments, the malware identification platform 103 is configured to enable rate-limiting to avoid over burdening a protected UE 101, or an available bandwidth for streaming the behavioral telemetry.

In some embodiments, the malware remediation platform 107, in correlation with one or more of the malware identification platform 103 and/or the malware defense platform 109, makes it possible to provide an instruction-only information security and assurance retrofit for existing platforms (e.g., deployed UE 101's) that have no integrated or other established defensive capabilities. The communicative abilities of the malware identification platform 103, the malware remediation platform 107 and/or the malware defense platform 109 make it possible to extend defensive capabilities to various hardware and firmware components, including assurance of FPGA operations.

Figure 6A:
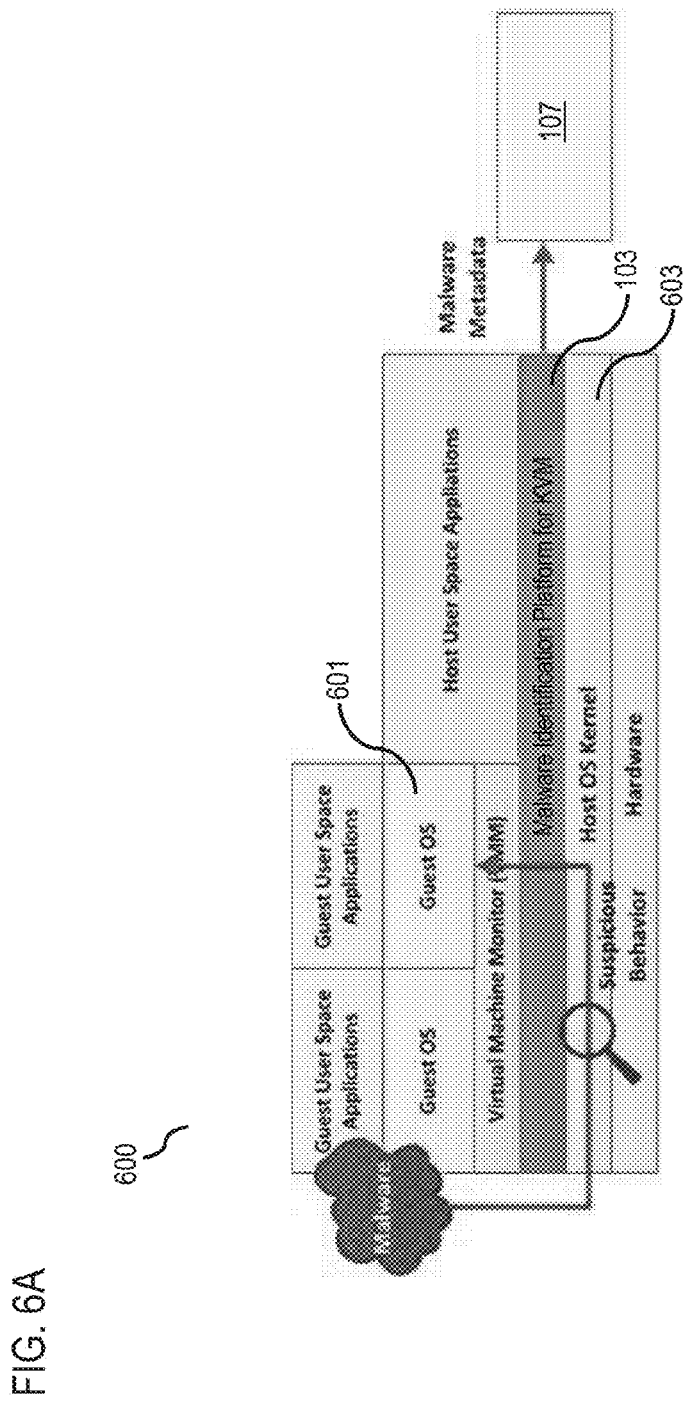
FIGS. 6A-6C are diagrams of the malware identification platform as configured to defend a computing device accessed by way of a Hypervisor or a Virtual Machine (VM) from a malicious process, in accordance with one or more embodiments.
Figure 6B:
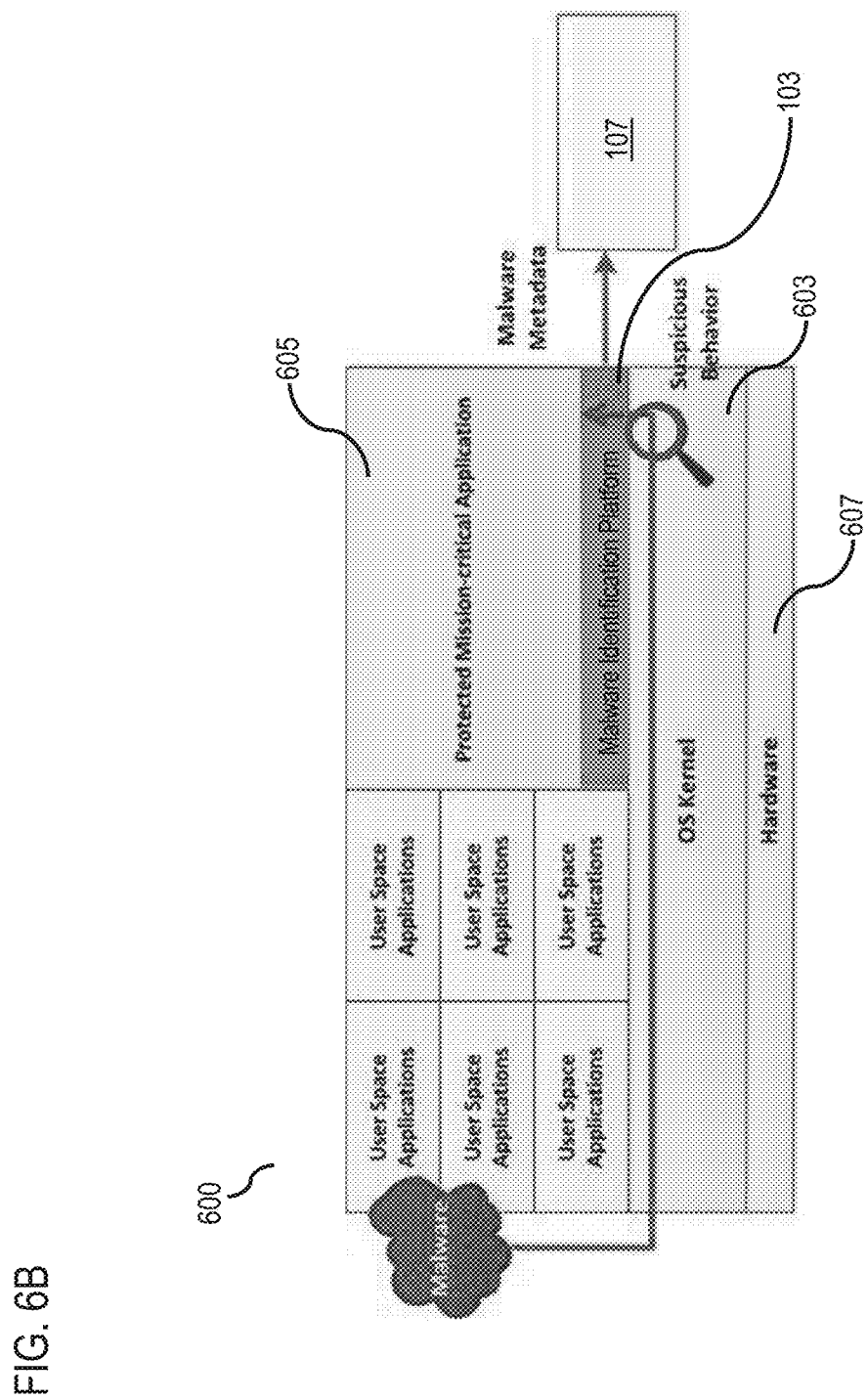
Figure 6C:
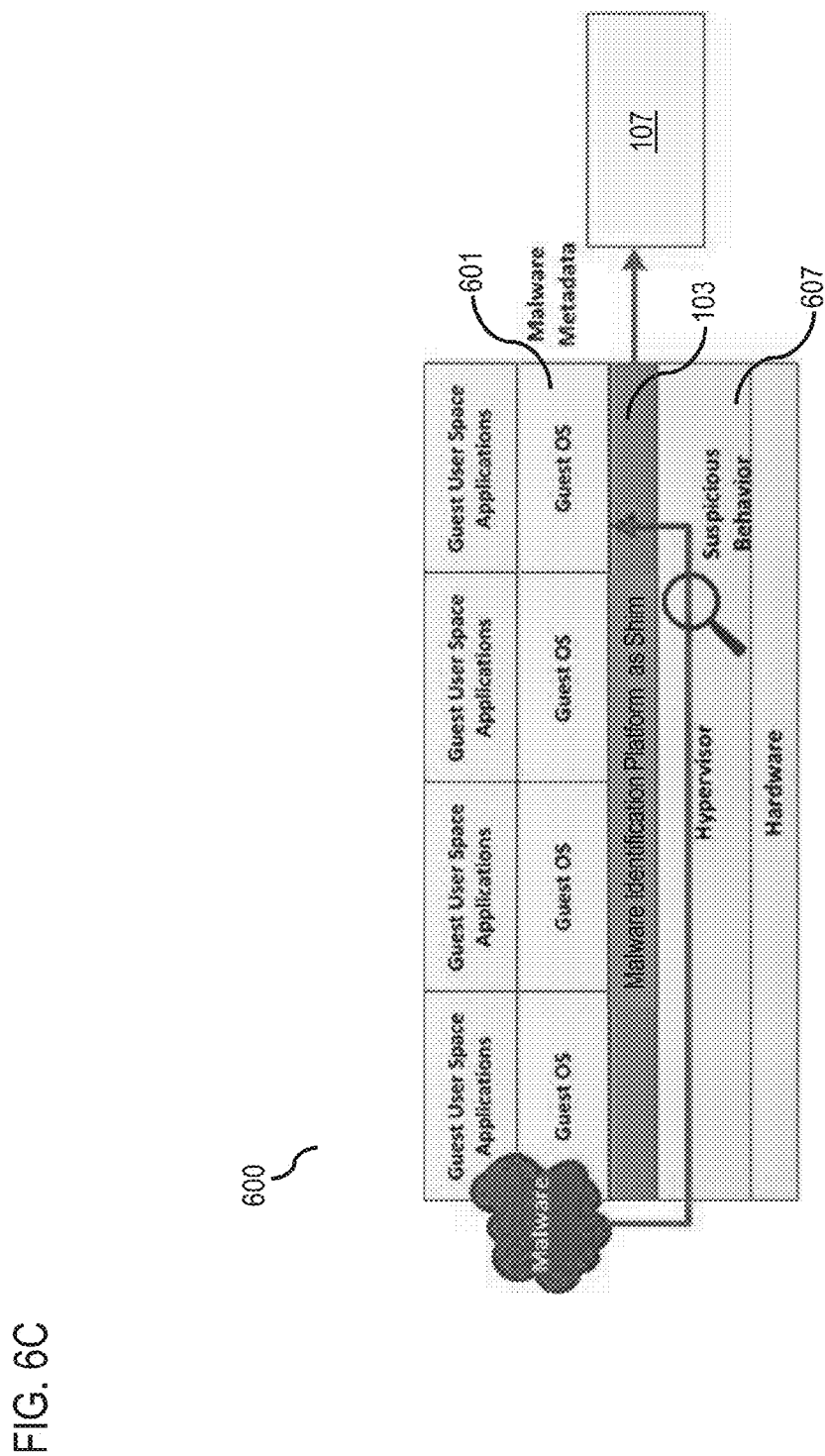

FIGS. 6A-6C are diagrams of the malware identification platform 103 as configured to defend a computing device accessed by way of a Hypervisor or a Virtual Machine (VM) from a malicious process, in accordance with one or more embodiments.

Due in large part to the shared resource nature of public and private cloud environments, security challenges have emerged making it difficult to provide sufficient (and verifiable) multi-tenant security controls. The OS virtualization capabilities enabled by modern Hypervisors (such as VMware's ESXi) provide an exploitable attack surface for malicious software running within Guest Virtual Machines (VMs). Although many traditional security technologies such as application-aware firewalls (often referred to as Next Generation Firewalls, or NGFW), Intrusion Detection and Prevention Service platforms (IDS and IPS respectively) and Web Application Firewalls (WAF) can be leveraged to address more obvious areas of exposure, traditional anti-malware protection techniques fail to provide effective protection in cloud computing environments.

As such, in some embodiments, the malware identification platform 103 is configured to provide Hypervisor-level protection without compromising the technical and economic benefits of public and private cloud deployments. The lightweight and complementary nature of the malware identification platform 103 make it possible to configure the malware identification platform 103 to be layered within a Hypervisor system 600 while having minimal performance considerations and without disruption to normal operation of the Hypervisor 600.

Although there are significant behavioral modeling differences between a common OS environment, such as a Linux or Windows Server, and a Hypervisor, such as VMware's ESXi, the malware identification platform 103 is configured to discriminate between normative and malicious behavior at a software process level to identify compromised VMs. In some embodiments, the malware identification platform 103 is configurable to accommodate more than one type of Hypervisor 600. For example, in some embodiments a protected Hypervisor 600 is a true lightweight Hypervisor (e.g., ESXi). In other embodiments, a protected Hypervisor 600 is a Para-virtualization (e.g., Microsoft's Hyper-V or Linux KVM), such as that illustrated in FIG. 6A.

Para-virtualization Hypervisors (more commonly known as Kernel Virtual Machine [KVM]), treat each Guest OS 601 or VM as an individual software process within the Host OS kernel 603, allowing the Host OS kernel 603 to democratize system resources largely through established scheduling and sharing policies which provide a clear economy of scale. The Host OS kernel 603 is further capable of virtualizing other system objects such as network and disk I/O controllers to present, what appears to the Guest OS 601, as physical resources.

The malware identification platform 103 is configured to compatibly apply the above-discussed behavioral modeling to the Host OS kernel 603's process or object-centric approach to OS virtualization. Although the nature and process scheduling of Guest OS 601 will differ from that of native Host OS kernel 603's processes, the malware identification platform 103 is configured to identify an emergent behavioral model that the malware identification platform 103 is configured to use to characterize normative behavior from abnormal behavior indicative of malicious processes and other compromises. In embodiments, the same kernel-level visibility applied by the malware identification platform 103 to monitor and protect the Host OS 603 is leveraged to monitor and protect the Guest OS 601, and communicate abnormal behavior to the malware remediation platform 107.

In some embodiments, the malware identification platform 103 is configured to address a broader and more complex challenge of securing Para-virtualization environments. For example, as illustrated in FIG. 6B, the malware identification platform 103 is configurable to be applied in a process or software thread-specific security model of a Hypervisor 600. In such a model, the malware identification platform 103 is configured to closely monitor and protect a specific, mission-critical, software process 605, allowing the safe commingling of commodity and sensitive workloads to not only share the same computing environment but to also share the same kernel or KVM Host OS 603. In other words, the malware identification platform 103 is capable of being configured to be tuned to act as a 'watchdog' for a mission-critical software process 605, providing both real-time protection, as well as more complete, Information Assurance (IA) as communicated, for example, to the malware remediation platform 107.

In some embodiments, the application specific configuration of the malware identification module 103 is configurable, to protect the performance and IA attributes of specialized hardware resources 607 such as FPGAs or other embedded systems that are otherwise difficult or impossible to monitor using conventional anti-malware techniques.

Although sharing many of the same basic components for managing hardware and software resources, namely Guest OS's and internal management functions, some Hypervisors provide a smaller, but often more obscure attack surface. This however does not make Hypervisors immune from attack. Rather, it merely changes the vectors an attacker must use to gain some level of control. For example, attackers often gain some control over a compromised system via a Guest OS or Hypervisor management tool, and not through more direct means. Indirect attacks that exploit the shared nature of virtualization, specifically shared (or ballooned) memory, contextual caching, and direct hardware access, is difficult to detect as compared to non-virtualized systems. Guest OS's are often 'unaware' of their virtual disposition, and Hypervisors are largely incapable of presenting granular access to the sensitive scheduling and control over shared resources that may reveal malicious activities.

As such, in some embodiments, as illustrated in FIG. 6C, the malware identification platform 103 is configured to be combinable as a 'Hypervisor shim' with a regulated Hypervisor API access 607 (known as 'VMSafe' by VMware) to expose the inner workings of both the Hypervisor 600 and Guest OS's 601. Exposing the inner-working of the Hypervisor 600 and the Guest OS's 601 makes it possible for the malware identification platform 103 to establish a behavioral model that can be used by the malware identification platform 103 to monitor and protect a virtualized system such as Hypervisor 600. This combined approach to monitoring Hypervisor-level activities provides visibility for both direct and indirect attack vectors that may be exploited to gain and escalate control within a virtualized system.

Figure 7:
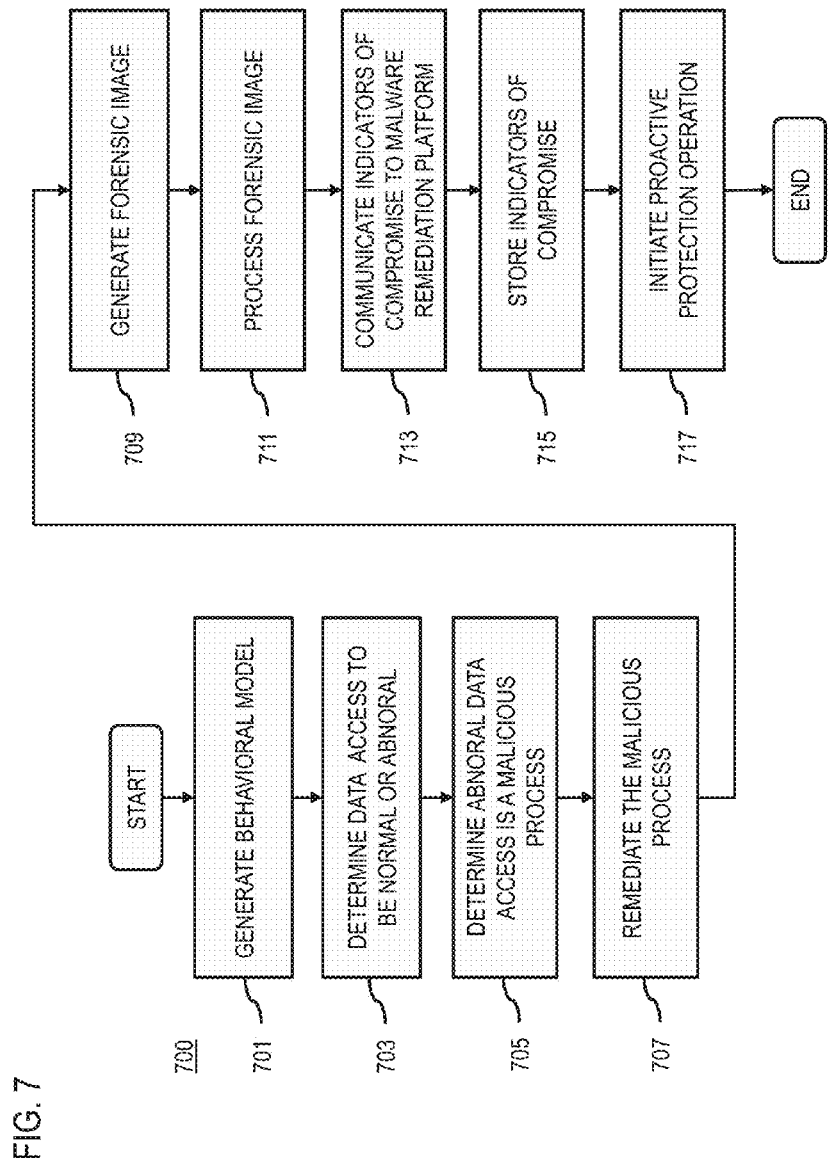
FIG. 7 is a flowchart of a method for providing behavioral model based identification, analysis and/or remediation of computing system security threats, in accordance with one or more embodiments.

FIG. 7 is a flowchart of a method 700 for providing behavioral model based computing system security, in accordance with one or more embodiments. Method 700 begins with step 701 in which a processor such as processor 803, or a control platform or module such as the malware identification platform 103, implemented in chip set 800 discussed in FIG. 8, executes an instruction to generate a behavioral model configured to describe one or more interactions associated with a protected data accessible by way of a computing device. In step 703, an attempt to access the protected data is determined to be one of normal or abnormal based, at least in part, on a comparison between the attempt to access the protected data and/or data or processes associated with the attempt to access the protected data and the behavioral model. In step 705, the attempt to access the protected data is deemed to be a malicious process based, at least in part, on a determined degree of variation from the behavioral model. In step 707, the malicious process is remediated with respect to the computing device.

In some embodiments, the behavioral model is generated by a behavioral modeling module remote from the computing device, the behavioral model is shared with a malicious process determination module, the malicious process determination module processes the attempt to access the protected data and compares the attempt to access the protected data with the received behavioral model, and the malicious process determination module is remote from the computing device. In some embodiments, the one or more interactions associated with the protected data comprise one or more of a file system event, a read or write interaction accessing the protected data, or a change to metadata.

In some embodiments, remediation of the malicious process comprises terminating the malicious process, identifying and removing data associated with the malicious process from a memory, and identifying and removing persistence mechanisms that are configured to allow the malicious process to reoccur.

In some embodiments, the behavioral model is based, at least in part, on received information associated with one or more of a user interacting with the computing device configured to access the protected data, the computing device configured to access the protected data, a network portal configured to enable the computing device configured to access the protected data to communicate with a remote computing device, a process by which the protected data is accessed, a file type of the protected data, metadata, or a time the protected data is accessed.

In some embodiments, computing device is accessible by way of a hypervisor and the attempt to access the protected data occurs by way of the hypervisor.

In step 709, a forensic image of one or more of the malicious process, one or more processes related to the malicious process, data associated with the malicious process, or data associated with the one or more processes related to the malicious process is generated. In step 711, the forensic image is processed to determine one or more indicators of compromise associated with the malicious process.

In step 713, the one or more indicators of compromise are communicated to a malicious process remediation platform.

In step 715, one or more of the forensic image, the one or more indicators of compromise, an event log detailing the one or more interactions with the protected data, or the metadata is caused to be stored in a database. In some embodiments, the malicious process remediation platform stores the one or more of the forensic image, the one or more indicators of compromise, an event log detailing the one or more interactions with the protected data, or the metadata to be stored in the database. In some embodiments, the malicious process remediation platform and the database are remote from the computing device.

In step 717, the malicious process remediation platform is caused to initiate a proactive protection operation. In some embodiments, the proactive protection operation comprises sharing the one or more indicators of compromise with one or more other computing devices associated with the malicious process remediation platform, causing, at least in part, memory related to the one or more other computing devices to be scanned for the one or more indicators of compromise, determining the one or more indicators of compromise exist in the memory related to the one or more other computing devices, the one or more indicators of compromise indicating the malicious process is occurring or has occurred in the one or more other computing devices, and causing, at least in part, the malicious process to be remediated with respect to the one or more other computing devices.

In some embodiments, one or more of the computing device or the one or more other computing devices comprise a network portal, and the remediation of the malicious process with respect to the computing device or the remediation of the malicious process with respect to the one or more other computing devices comprises determining network traffic, and one or more of blocking network traffic through the network portal to the computing device or the one or more other computing devices, or redirecting network traffic through the network portal away from the computing device or the one or more other computing devices. In some embodiments, network portal comprises one or more of a router, a switch, a firewall, or an intrusion protection service.

The processes described herein for providing behavioral model based computing system security may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
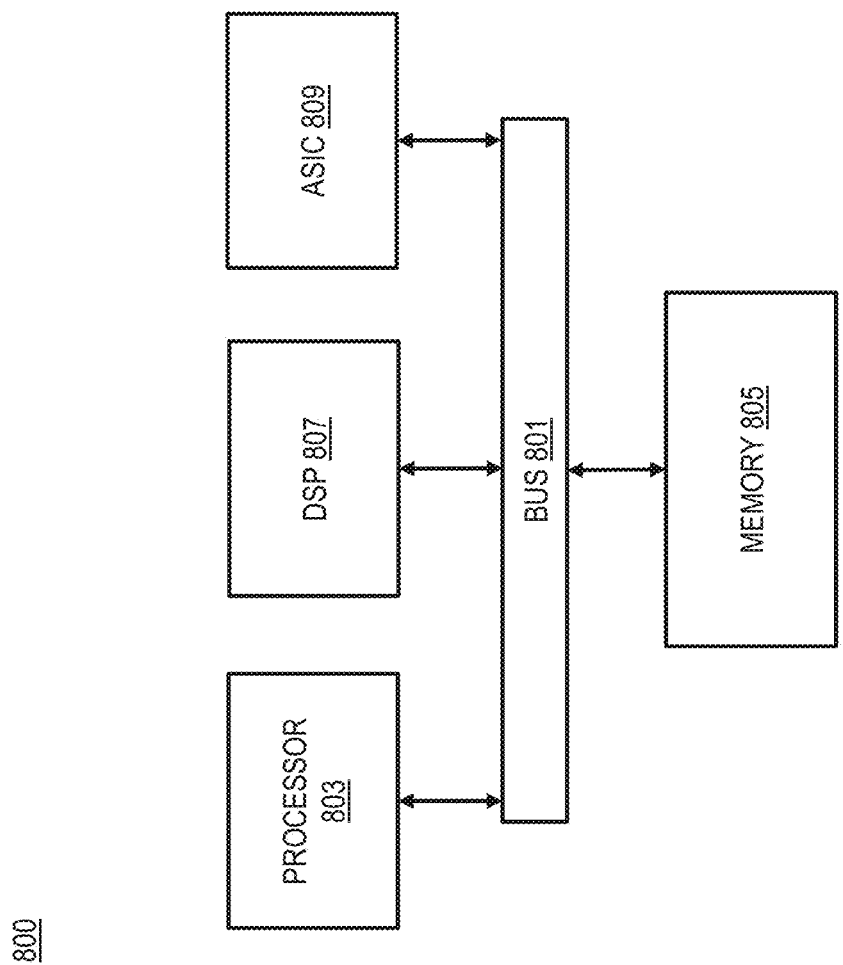
FIG. 8 illustrates a chip set or chip upon which or by which an embodiment is implemented.

FIG. 8 illustrates a chip set or chip 800 upon which or by which an embodiment is implemented. Chip set 800 is programmed to provide behavioral model based computing system security, as described herein, and includes, for example, bus 801, processor 803, memory 805, DSP 807 and ASIC 809 components.

The processor 803 and memory 805 are incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 are implemented in a single chip. It is further contemplated that in certain embodiments the chip set or chip 800 is implemented as a single "system on a chip." It is further contemplated that in certain embodiments a separate ASIC would not be used, for example, and that all relevant functions as disclosed herein would be performed by a processor or processors, e.g., processor 803. Chip set or chip 800, or a portion thereof, constitutes a mechanism for performing one or more steps of providing behavioral model based computing system security.

In one or more embodiments, the chip set or chip 800 includes a communication mechanism such as bus 801 for passing information among the components of the chip set 800. Processor 803 has connectivity to the bus 801 to execute instructions and process information stored in, for example, the memory 805. In some embodiments, the processor 803 is also accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 803 performs a set of operations on information as specified by computer program code related to providing behavioral model based computing system security. The computer program code is a set of instructions or statements providing instructions for the operation of the processor and/or the computer system to perform specified functions.

The processor 803 and accompanying components have connectivity to the memory 805 via the bus 801. The memory 805 includes one or more of dynamic memory (e.g., RAM, magnetic disk, writable optical disk, etc.) and static memory (e.g., ROM, CD-ROM, etc.) for storing executable instructions that when executed perform the steps described herein to provide behavioral model based computing system security. The memory 805 also stores the data associated with or generated by the execution of the steps.

In one or more embodiments, the memory 805, such as a random access memory (RAM) or any other dynamic storage device, stores information including processor instructions for providing behavioral model based computing system security. Dynamic memory allows information stored therein to be changed by system 100. RAM allows a unit of information stored at a location called a memory address to be stored and retrieved independently of information at neighboring addresses. The memory 805 is also used by the processor 803 to store temporary values during execution of processor instructions. In various embodiments, the memory 805 is a read only memory (ROM) or any other static storage device coupled to the bus 801 for storing static information, including instructions, that is not changed by the system 100. Some memory is composed of volatile storage that loses the information stored thereon when power is lost. In some embodiments, the memory 805 is a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 803, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, or another medium from which a computer can read. The term computer-readable storage medium is used herein to refer to a computer-readable medium.

One aspect of this description relates to a method comprising generating a behavioral model configured to describe one or more interactions associated with a protected data accessible by way of a computing device. The method also comprises determining an attempt to access the protected data is abnormal based, at least in part, on a comparison between the attempt to access the protected data and the behavioral model. The method further comprises determining the abnormal attempt to access the protected data is a malicious process based, at least in part, on a determined degree of variation from the behavioral model. The method additionally comprises causing, by a processor, the malicious process to be remediated with respect to the computing device.

Another aspect of this description relates to an apparatus comprising at least one processor and at least one memory including computer program code for one or more programs, the at least one memory and the computer program code configured to, with the at least one processor, cause the apparatus to generate a behavioral model configured to describe one or more interactions associated with a protected data accessible by way of a computing device. The apparatus is also caused to determine an attempt to access the protected data is abnormal based, at least in part, on a comparison between the attempt to access the protected data and the behavioral model. The apparatus is further caused to determine the abnormal attempt to access the protected data is a malicious process based, at least in part, on a determined degree of variation from the behavioral model. The apparatus is additionally caused to cause the malicious process to be remediated with respect to the computing device.

Still another aspect of this description relates to a computer-readable storage medium carries one or more sequences of one or more instructions which, when executed by one or more processors, cause, at least in part, an apparatus to generate a behavioral model configured to describe one or more interactions associated with a protected data accessible by way of a computing device. The apparatus is also caused to determine an attempt to access the protected data is abnormal based, at least in part, on a comparison between the attempt to access the protected data and the behavioral model. The apparatus is further caused to determine the abnormal attempt to access the protected data is a malicious process based, at least in part, on a determined degree of variation from the behavioral model. The apparatus is additionally caused to cause the malicious process to be remediated with respect to the computing device.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. Although features of various embodiments are expressed in certain combinations among the claims, it is contemplated that these features can be arranged in any combination and order. It is therefore intended that the protection granted hereon be limited only by the definition contained in the appended claims and equivalents thereof.

What is claimed is:

1. A method comprising:
generating a behavioral model configured to describe one or more interactions associated with a protected data accessible by way of a computing device;
determining an attempt to access the protected data is abnormal based, at least in part, on a comparison between the attempt to access the protected data and the behavioral model;
determining the abnormal attempt to access the protected data is a malicious process based, at least in part, on a determined degree of variation from the behavioral model;
generating a forensic image of one or more of the malicious process, one or more processes related to the malicious process, data associated with the malicious process, or data associated with the one or more processes related to the malicious process;
causing, by a processor, the malicious process to be remediated with respect to the computing device;
processing the forensic image to determine one or more indicators of compromise associated with the malicious process;
causing, at least in part, the one or more indicators of compromise to be communicated to a malicious process remediation platform; and
causing, at least in part, the malicious process remediation platform to initiate a proactive protection operation, the proactive protection operation comprising:
sharing the one or more indicators of compromise with one or more other computing devices associated with the malicious process remediation platform;
causing, at least in part, memory related to the one or more other computing devices to be scanned for the one or more indicators of compromise;
determining the one or more indicators of compromise exist in the memory related to the one or more other computing devices, the one or more indicators of compromise indicating the malicious process is occurring or has occurred in the one or more other computing devices; and
causing, at least in part, the malicious process to be remediated with respect to the one or more other computing devices,
wherein the forensic image is generated during execution of the malicious process.

2. The method of claim 1, further comprising:
causing, at least in part, one or more of the forensic image, the one or more indicators of compromise, an event log detailing the one or more interactions with the protected data, or metadata to be stored in a database.

3. The method of claim 2, wherein the malicious process remediation platform stores the one or more of the forensic image, the one or more indicators of compromise, the event log detailing the one or more interactions with the protected data, or the metadata in the database.

4. The method of claim 2, wherein the malicious process remediation platform and the database are remote from the computing device.

5. The method of claim 1, wherein one or more of the computing device or the one or more other computing devices comprise a communication device, and the remediation of the malicious process with respect to the computing device or the remediation of the malicious process with respect to the one or more other computing devices comprises:
determining network traffic; and
one or more of blocking network traffic through the communication device to the computing device or the one or more other computing devices, or redirecting network traffic through the communication device away from the computing device or the one or more other computing devices.

6. The method of claim 5, wherein the communication device comprises one or more of a router, a switch, a firewall, or an intrusion protection service.

7. The method of claim 1, wherein the behavioral model is generated by a behavioral modeling module remote from the computing device, the behavioral model is shared with a malicious process determination module, the malicious process determination module processes the attempt to access the protected data and compares the attempt to access the protected data with the received behavioral model, and the malicious process determination module is remote from the computing device.

8. The method of claim 1, wherein the one or more interactions associated with the protected data comprise one or more of a file system event, a read or write interaction accessing the protected data, or a change to metadata.

9. The method of claim 1, wherein remediation of the malicious process comprises:
terminating the malicious process;
identifying and removing data associated with the malicious process from a memory; and
identifying and removing persistence mechanisms that are configured to allow the malicious process to reoccur.

10. The method of claim 1, wherein the behavioral model is based, at least in part, on received information associated with one or more of a user interacting with the computing device configured to access the protected data, the computing device configured to access the protected data, a network portal configured to enable the computing device configured to access the protected data to communicate with a remote computing device, a process by which the protected data is accessed, a file type of the protected data, metadata, or a time the protected data is accessed.

11. The method of claim 1, wherein the computing device is accessible by way of a hypervisor and the attempt to access the protected data occurs by way of the hypervisor.

12. An apparatus comprising:
at least one processor; and
at least one memory including computer program code for one or more programs,
the at least one memory and the computer program code configured to, with the at least one processor, cause the apparatus to perform at least the following,
generate a behavioral model configured to describe one or more interactions associated with a protected data accessible by way of a computing device;
determine an attempt to access the protected data is abnormal based, at least in part, on a comparison between the attempt to access the protected data and the behavioral model;
determine the abnormal attempt to access the protected data is a malicious process based, at least in part, on a determined degree of variation from the behavioral model;
generate a forensic image of one or more of the malicious process, one or more processes related to the malicious process, data associated with the malicious process, or data associated with the one or more processes related to the malicious process;

cause, by the at least one processor, the malicious process to be remediated with respect to the computing device;

process the forensic image to determine one or more indicators of compromise associated with the malicious process;

cause, at least in part, the one or more indicators of compromise to be communicated to a malicious process remediation platform; and cause, at least in part, the malicious process remediation platform to initiate a proactive protection operation, the proactive protection operation comprising:

sharing the one or more indicators of compromise with one or more other computing devices associated with the malicious process remediation platform;

causing, at least in part, memory related to the one or more other computing devices to be scanned for the one or more indicators of compromise;

determining the one or more indicators of compromise exist in the memory related to the one or more other computing devices, the one or more indicators of compromise indicating the malicious process is occurring or has occurred in the one or more other computing devices; and causing, at least in part, the malicious process to be remediated with respect to the one or more other computing devices, wherein the forensic image is generated during execution of the malicious process.

13. The apparatus of claim 12, wherein the apparatus is further caused to:

cause, at least in part, one or more of the forensic image, the one or more indicators of compromise, an event log detailing the one or more interactions with the protected data, or metadata to be stored in a database.

14. The apparatus of claim 13, wherein the malicious process remediation platform stores the one or more of the forensic image, the one or more indicators of compromise, the event log detailing the one or more interactions with the protected data, or the metadata in the database.

15. The apparatus of claim 13, wherein the malicious process remediation platform and the database are remote from the computing device.

16. The apparatus of claim 12, wherein one or more of the computing device or the one or more other computing devices comprise a communication device, and to remediate the malicious process with respect to the computing device or to remediate the malicious process with respect to the one or more other computing devices, the apparatus is caused to:

determine network traffic; and one or more of block network traffic through the communication device to the computing device or the one or more other computing devices, or redirect network traffic through the network portal away from the computing device or the one or more other computing devices.

17. The apparatus of claim 16, wherein the communication device comprises one or more of a router, a switch, a firewall, or an intrusion protection service.

18. The apparatus of claim 12, wherein the behavioral model is generated by a behavioral modeling module remote from the computing device, the behavioral model is shared with a malicious process determination module, the malicious process determination module is configured to process the attempt to access the protected data and to compare the attempt to access the protected data with the received behavioral model, and the malicious process determination module is remote from the computing device.

19. The apparatus of claim 12, wherein the one or more interactions associated with the protected data comprise one or more of a file system event, a read or write interaction accessing the protected data, or a change to metadata.

20. The apparatus of claim 12, wherein to remediate the malicious process, the apparatus is caused to:

terminate the malicious process;

identity and remove data associated with the malicious process from a memory; and identity and remove persistence mechanisms that are configured to allow the malicious process to reoccur.

21. The apparatus of claim 12, wherein the behavioral model is based, at least in part, on received information associated with one or more of a user interacting with the computing device configured to access the protected data, the computing device configured to access the protected data, a network portal configured to enable the computing device configured to access the protected data to communicate with a remote computing device, a process by which the protected data is accessed, a file type of the protected data, metadata, or a time the protected data is accessed.

* * * * *